United States Patent [19]
Davis

[11] Patent Number: 4,816,820
[45] Date of Patent: Mar. 28, 1989

[54] RADIO COMMUNICATION RECEIVER WITH APPARATUS FOR ALTERING BIT RATE OF THE RECEIVER

[75] Inventor: Walter L. Davis, Coral Springs, Fla.

[73] Assignee: Motorola, Inc., Schaumburg, Ill.

[21] Appl. No.: 938,081

[22] PCT Filed: Oct. 21, 1986

[86] PCT No.: PCT/US86/02199
§ 371 Date: Nov. 4, 1986
§ 102(e) Date: Nov. 4, 1986

[87] PCT Pub. No.: WO88/03349
PCT Pub. Date: May 5, 1988

[51] Int. Cl.⁴ .......................... H04Q 7/00; H04J 3/24
[52] U.S. Cl. ................................ 340/825.440; 370/84
[58] Field of Search ...................... 340/825.44, 825.52; 370/84, 72, 94, 82, 79

[56] References Cited
U.S. PATENT DOCUMENTS
| | | | |
|---|---|---|---|
| 4,336,613 | 6/1982 | Hewes | 455/266 |
| 4,427,980 | 1/1984 | Fennell et al. | 340/825.44 |
| 4,518,961 | 5/1985 | Davis et al. | 340/825.44 |
| 4,630,126 | 12/1986 | Kaku et al. | 358/280 |
| 4,642,632 | 2/1987 | Ohyagi et al. | 340/825.44 |
| 4,736,369 | 4/1988 | Barzilai | 370/94 |

FOREIGN PATENT DOCUMENTS
| | | |
|---|---|---|
| 0108938 | 5/1984 | European Pat. Off. |
| 2314623 | 6/1975 | France |
| 01268 | 8/1981 | PCT Int'l Appl. |

*Primary Examiner*—Donald J. Yusko
*Attorney, Agent, or Firm*—Daniel K. Nichols

[57] ABSTRACT

A radio communication receiver decodes digital signals transmitted over a radio link and is capable of altering the bit rate of the receiver to match the bit rate transmitted form a remote location. The receiver includes a receiver portion 21 receiving radio signals and producing a received signal. A microporocessor 26 is used for decoding the received signal. The microprocessor (26) is responsive to a bit rate signal that is generated by a programmable divider (33). The microprocessor (26) is adpated to detect a predetermined code signal to alter the timing characteristic of the bit rate signal for generating a bit rate signal at a second rate for decoding received signals at a second bit rate designated by the predetermined code signal.

5 Claims, 26 Drawing Sheets

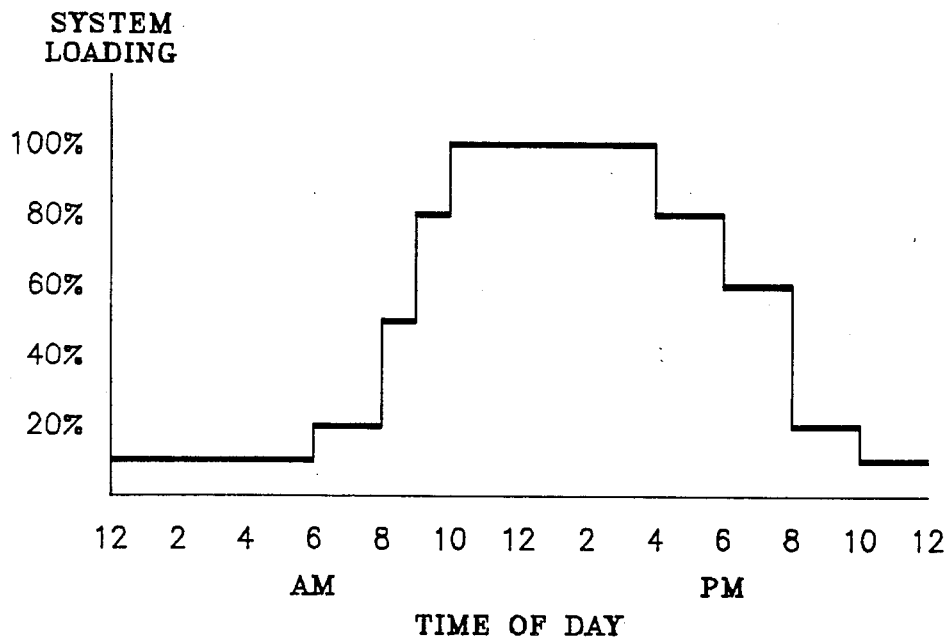
FIG. 6
FIG. 7A
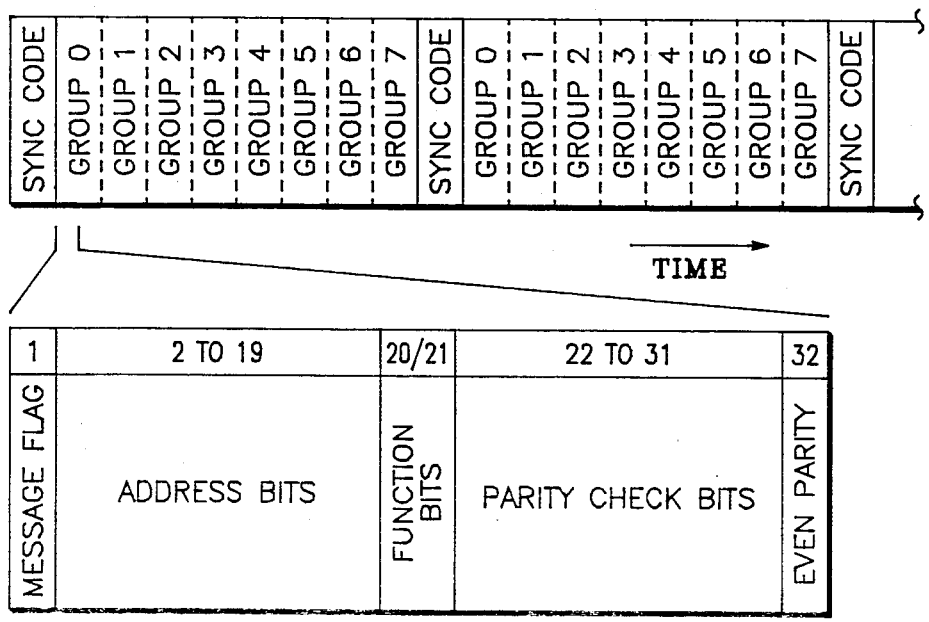
FIG. 7B

FIG. 8A
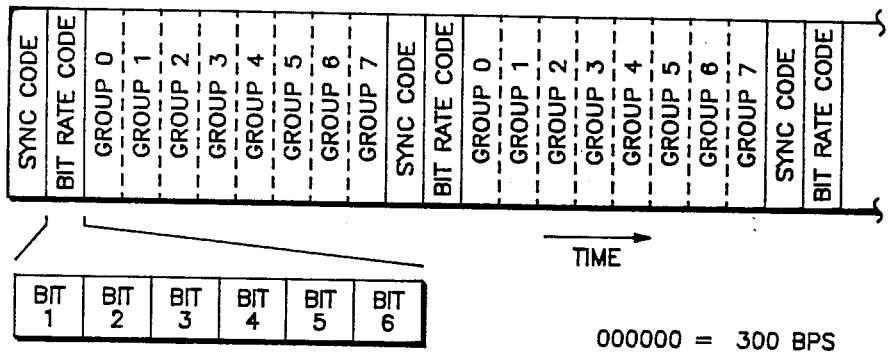
FIG. 8B
```
000000 =  300 BPS
010101 =  600 BPS
101010 = 1200 BPS
111111 = 2400 BPS
```
FIG. 8C
FIG. 9A   CHANGE BIT RATE COMMAND SIGNALS
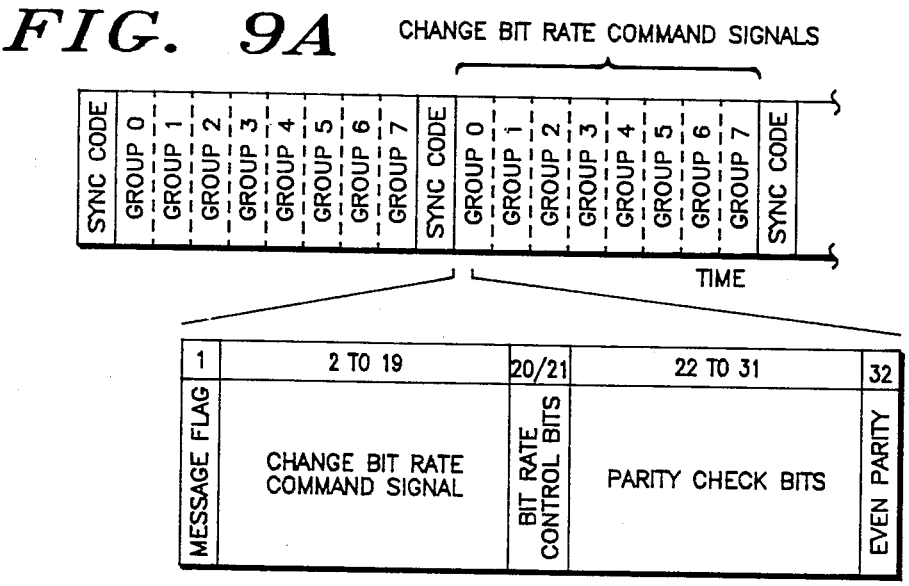
FIG. 9B
```
00 CONTROL BIT PATTERN =  300 BPS
01 CONTROL BIT PATTERN =  600 BPS
10 CONTROL BIT PATTERN = 1200 BPS
11 CONTROL BIT PATTERN = 2400 BPS
```
FIG. 9C

```
00 CONTROL BIT PATTERN =  300 BPS
01 CONTROL BIT PATTERN =  600 BPS
10 CONTROL BIT PATTERN = 1200 BPS
11 CONTROL BIT PATTERN = 2400 BPS
```

FIG. 11A
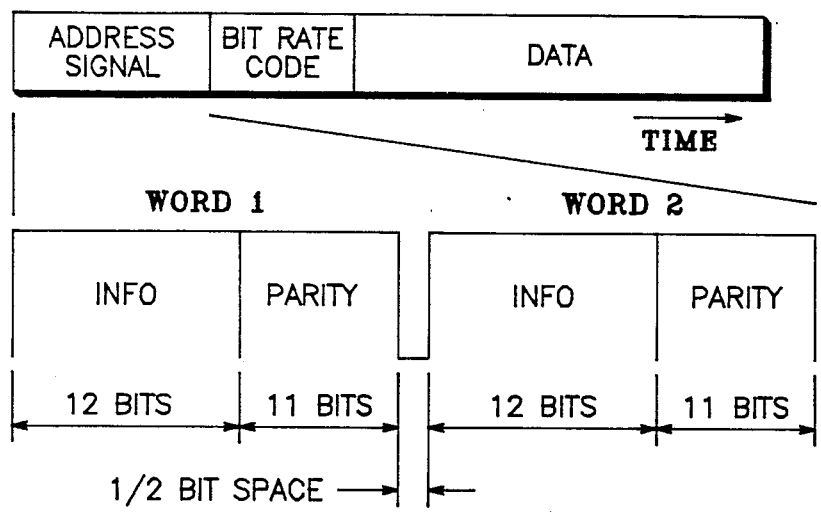
FIG. 11B
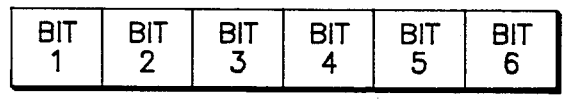
```
000000 = 300 BPS
010101 = 600 BPS
101010 = 1200 BPS
111111 = 2400 BPS
```
FIG. 11C

```
FUNCTION 1 (12)  =  300 BPS
FUNCTION 2 (1\overline{2})  =  600 BPS
FUNCTION 3 (\overline{1}2)  =  1200 BPS
FUNCTION 4 (\overline{12})  =  2400 BPS
```

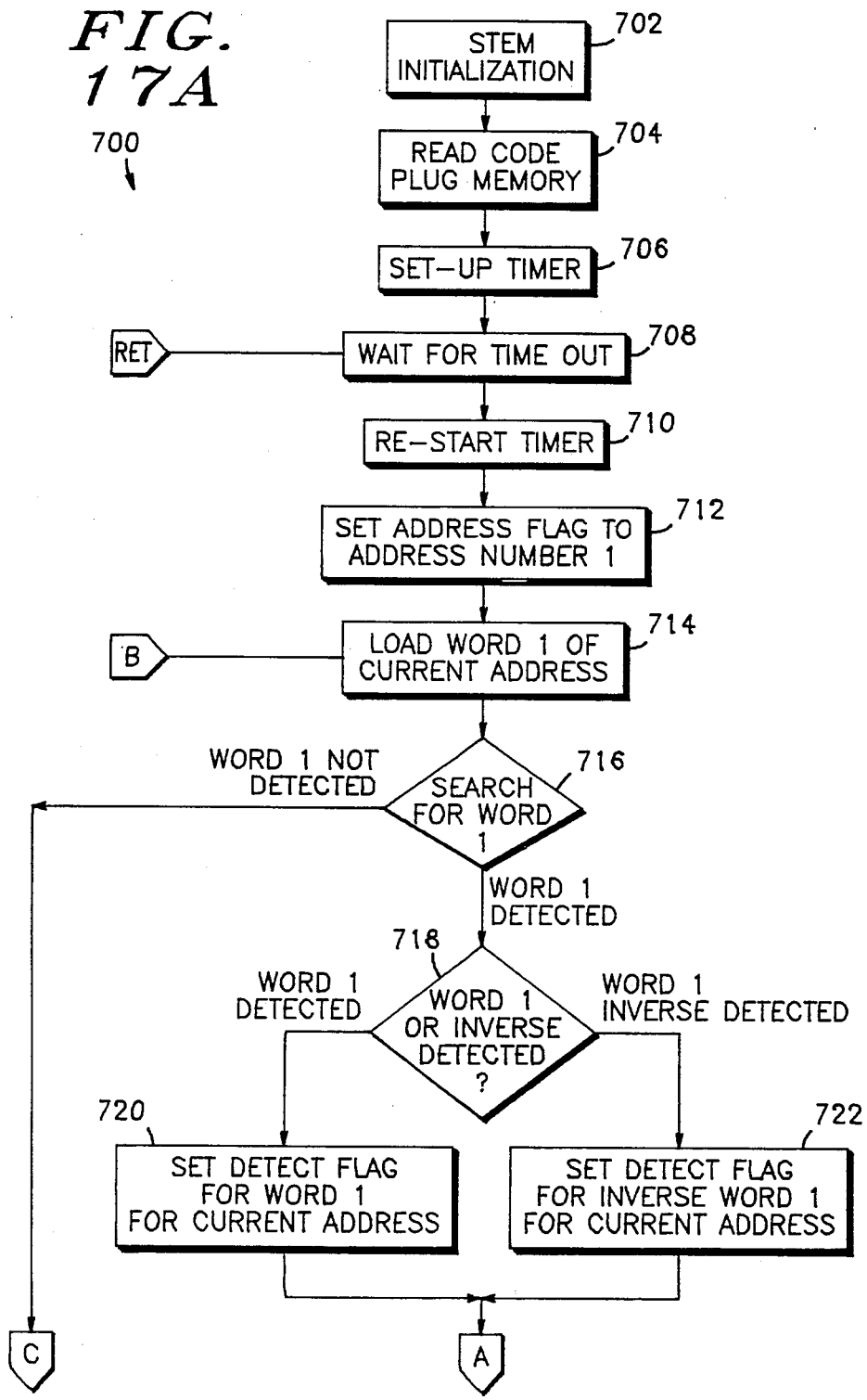

RADIO COMMUNICATION RECEIVER WITH APPARATUS FOR ALTERING BIT RATE OF THE RECEIVER

BACKGROUND OF THE INVENTION

This invention relates to radio communication receivers in general and particularly to receivers that decode digital signals transmitted over radio links to remote locations.

Such receivers can comprise selective call receivers of the type commonly utilized in radio paging systems. A selective call receiver is a receiver that responds and alerts the user to calls that are directed to it only and not generally to all calls on a frequency or channel. Conventionally, such radios recognize messages being transmitted to it by the particular address information of the transmitted signals. Commonly used address information signals include sequential tone signals comprised of multiple tones, and digitally encoded binary frequency shift keying (FSK) signals.

Digital code receivers include decoders that operate at approximately the bit rate of the transmitted digital signal, and serve to compare the signal patterns received from the transmitter with the signal patterns assigned to the pager. All digitally encoded pagers in use today are designed to operate at particular predetermined bit rates. For example, a receiver for a POCSAG system is designed to operate at 512 bits per second (bps), while a receiver for a Golay Sequential code (GSC) system is designed to decode addresses at 300 bps. A display pager in a Golay system decodes data messages at 600 bps.

As a general principle, the lower the bit rate of transmission the higher the sensitivity of the paging receiver and thus the higher the reliability regarding reception and decoding of the signal. Conversely, as the transmitted signal bit rate is increased the sensitivity of the receiver and reliability and accuracy of reception and decoding decreases. This is particularly pronounced in fringe areas where the radio signals may be subject to interference or fading.

In present selective call or radio paging systems, the system transmission bit rate is preselected to provide an acceptable level of accuracy for reception of digitally coded signals. Once this bit rate is chosen, the maximum of number of radio addresses of a given length that can be transmitted during any time interval is therefore determined.

System loading over a 24 hour period of a fully loaded paging system such as may be found in major metropolitan areas is illustrated in FIG. 6. In this illustration, the system is operating at 100 percent of full capacity during the day from 10:00 A.M. until 4:00 P.M. This means, that the transmitter is transmitting at 100 percent of its through-put capacity during this 6 hour interval during which the channel is fully loaded. New messages placed in the system during this time interval can encounter delays of up to 15 minutes as they are queued, waiting their turn for transmission. If the effective bit rate of transmitted signals in the system could be increased during this time interval, then the message through-put during these peak times could be increased thereby reducing or eliminating such queing delays. Conversely, during lull periods if the bit rate of transmitted signals in the system could be decreased, greater accuracy could be achieved without affecting system through-put.

SUMMARY OF THE INVENTION

The radio communication receiver embodying the present invention includes apparatus responsive to transmitted signals for altering the bit rate of the receiver for decoding incoming digital signals.

It is one object of the present invention to provide a radio paging system in which the signalling bit rate may be changed.

It is another object of the present invention to provide a radio paging system in which the signalling bit rate may be changed by the transmission of special bit rate control signals.

It is yet another object of the present invention to provide a radio paging receiver which can adapt to change in the system bit rate.

It is still another object of the present invention to provide a radio paging receiver in which the post detection signal filtering is adjusted in accordance with change in the signalling bit rate to provide optimum receiver sensitivity.

It is yet another object of the present invention to provide a flexible paging system in which the signal bit rate used to transmit data can be adjusted for just one message transmission or for all transmissions.

These and other objects will be more clearly defined in the following sections.

BRIEF DESCRIPTION OF THE DRAWINGS

FIG. 6 is a system loading chart for a heavily loaded paging system.

FIGS. 7A and 7B comprise a descriptive diagram for a conventional data encoding system.

FIGS. 8A, 8B and 8C comprise a descriptive diagram for a first data encoding system, for the preferred embodiments of the invention.

FIGS. 9A, 9B and 9C comprise a descriptive diagram for a second data encoding system for the preferred embodiment of the invention.

FIGS. 11A, 11B and 11C comprise a descriptive diagram for a fourth data encoding system for the preferred embodiment of the invention.

FIGS. 17A, 17B and 17C comprise a detailed flowchart of the implementation of the preferred embodiment of the invention utilizing the data encoding system of FIGS. 12A–12C.

DESCRIPTION OF THE PREFERRED EMBODIMENT

Figure 1:
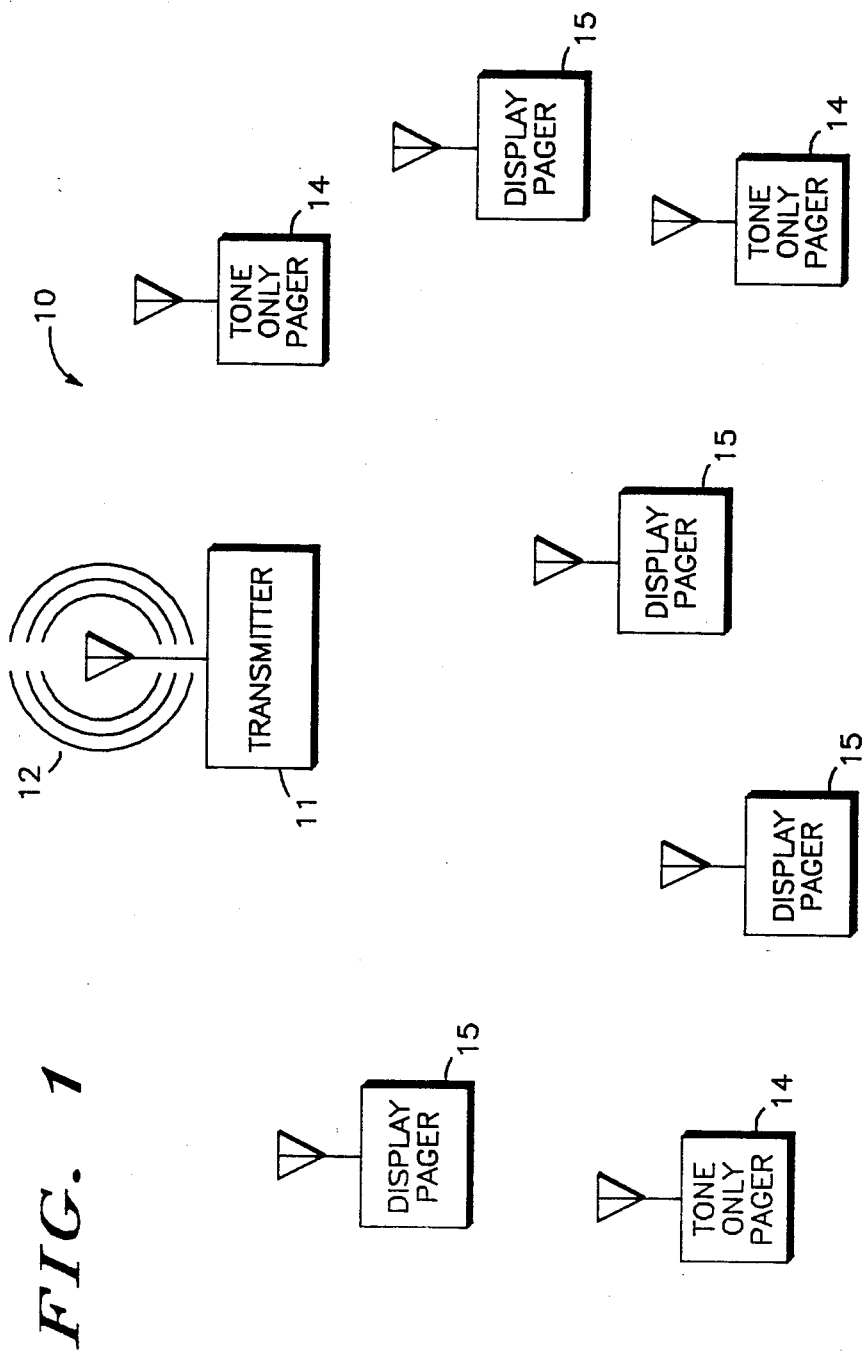
FIG. 1 is a graphic representation of a typical radio communications system.

Referring now by characters of reference to the drawings and first to FIG. 1, it will be understood that the radio communication system 10 includes a transmitter 11 comprising transmitter means that transmits signals from antenna 12 to a plurality of selective call receivers such as tone only pagers 14 and/or display pagers 15. The tone only pagers 14 are receivers that provide a tone alert signal when their address is received, they do not provide voice or data messages. The display pagers 15, in addition to generating an alert, include a display for displaying numeric or alphanumeric messages. Other types of selective call receivers such as tone and voice pagers (not shown) which provide voice messages can be utilized.

Figure 2:
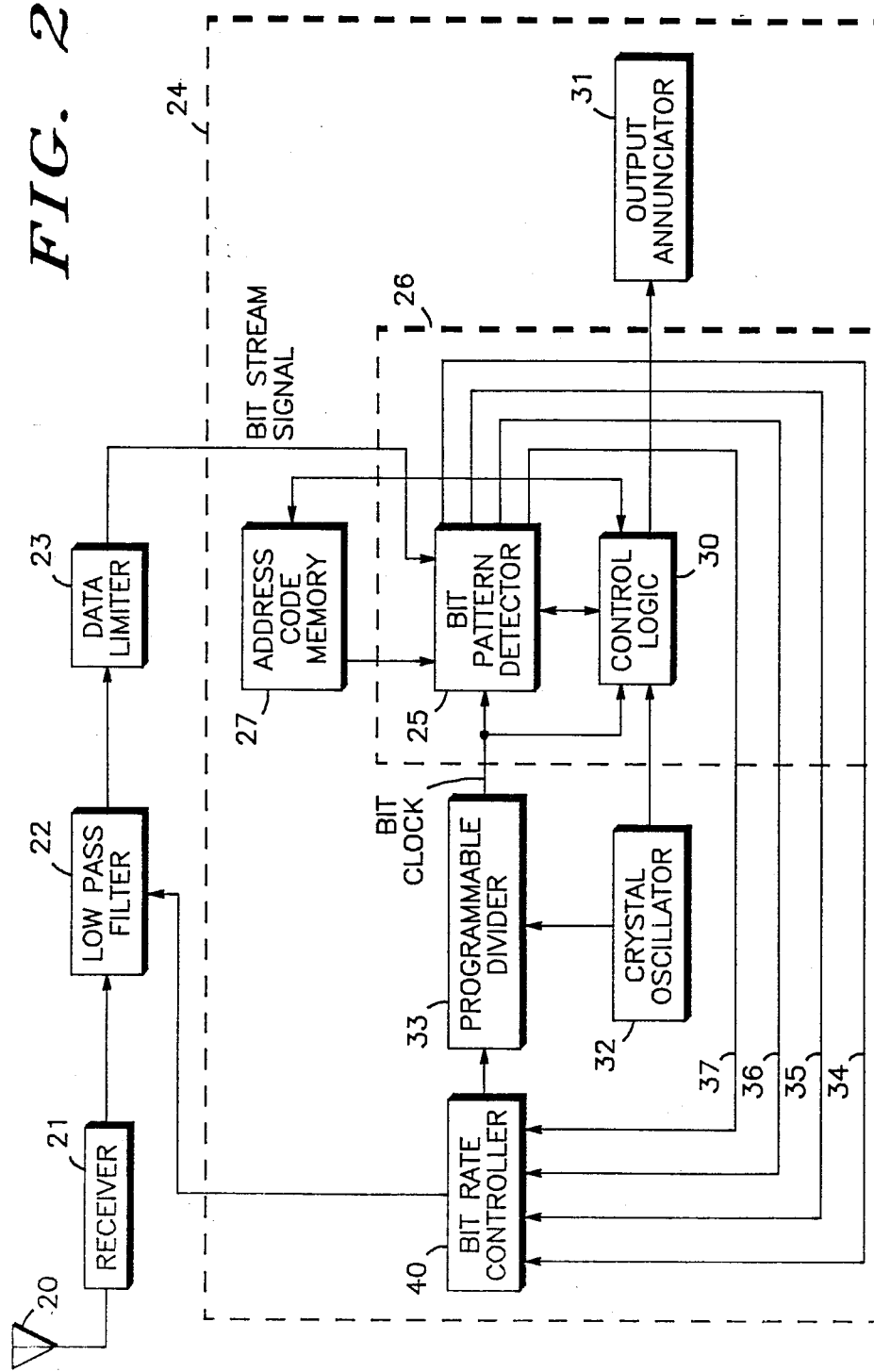
FIG. 2 is a block diagram of a radio communication receiver in accordance with the present invention and having an apparatus for altering the bit rate of the receiver.

A block diagram of a radio communication receiver having an apparatus for altering the bit rate of the receiver, such as a tone only pager 14, is shown in FIG. 2. The transmitted rf signal from transmitter 11 is picked up at antenna 20 and applied to a conventional receiver portion designated 21, detected rf signals are passed through low pass filter 22 and then through data limiter 23 before supplying the digital signal to the receiver control portion 24.

The digital signals are applied to a bit pattern detector 25 of a microcomputer 26 where they are compared with address codes that are stored in an address code memory 27. Control logic 30 interfaces with the bit pattern detector 25 and the address code memory 27 as well as an output annunciator 31 which constitutes output signalling means. In a display pager such as that indicated at 15 in FIG. 1, the output annunciator 31 would typically include an LCD for displaying numeric or alphanumeric messages as well as a tone alert generator as is used with the tone only pagers 14.

A crystal oscillator 32, constituting a reference oscillator, supplies timing signals to both the control logic 30 and to a programmable divider 33, constituting divider means. The bit pattern detector 25 is connected as by lines 34–37 to a bit rate controller 40 which is connected to both the programmable divider 33 and low pass filter 22. The circuitry of the bit rate controller 40 and low pass filter 22 are shown in further detail in FIG. 3.

The bit rate controller 40 includes type D flip-flops 41, 42, 43 and 44 connected to lines 34–37 respectively at their D inputs. Lines 34–37 are also connected to four inputs of an OR gate 45 which has its output connected to the clock C inputs of flip-flops 41–44. Whenever one of the lines 34–37 switches high, OR gate 45 clocks the D flip-flops 41–44 thereby latching the output of the bit pattern detector 25 on lines 34–37 into the bit rate controller 40.

The bit rate controller 40 further includes four output lines 51–54 which are connected to the Q outputs of flip flops 41–44 respectively. Lines 51–54 are connected to both the low pass filter 22 and programmable divider 33. The pass band or cutoff frequency of low pass filter 22 is determined by the output of bit rate controller 40. This is accomplished by using transistor switches 61–64 for selecting the capacitance of the filter 22. Output lines 51–54 are coupled through resistors 55–58 to base connections of transistors 61–64 respectively. Capacitors 65–68 are connected from the output of low pass filter 22 to the collectors of transistor 61–64 respectively. The emitters of transistors 61–64 are each connected to ground. Connected between the input and output of low pass filter 22 is a resistor 69.

Figure 4:
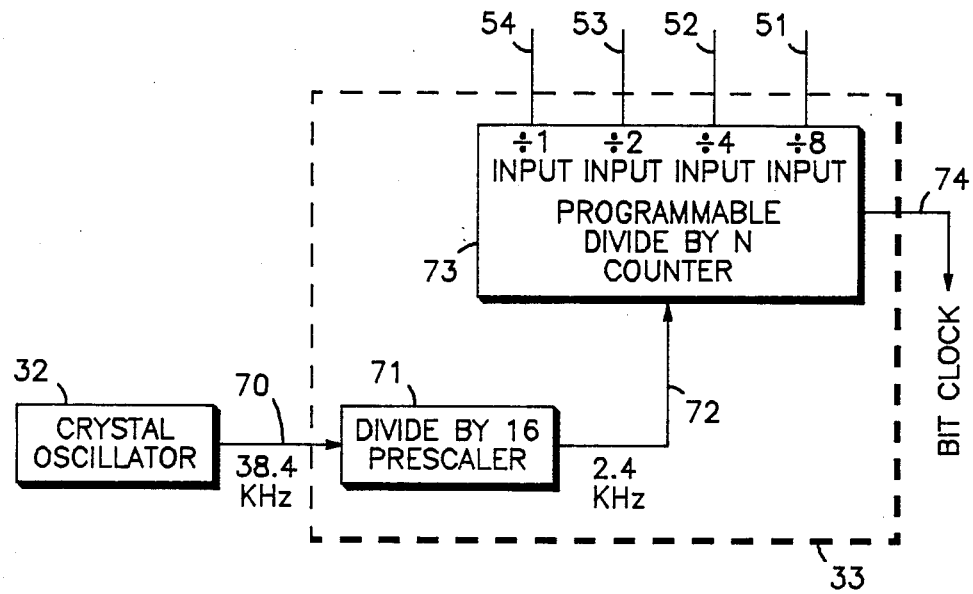
FIG. 4 is a block diagram of the programmable divider of FIGS. 2 and 3.

In operation, a particular one of the transistors 61–64 is turned on causing its associated capacitor to be actuated to determine the cut off frequency of low pass filter 22. The connection of bit rate controller 40 to the programmable divider 33 is shown in further detail in FIG. 4.

Figure 3:
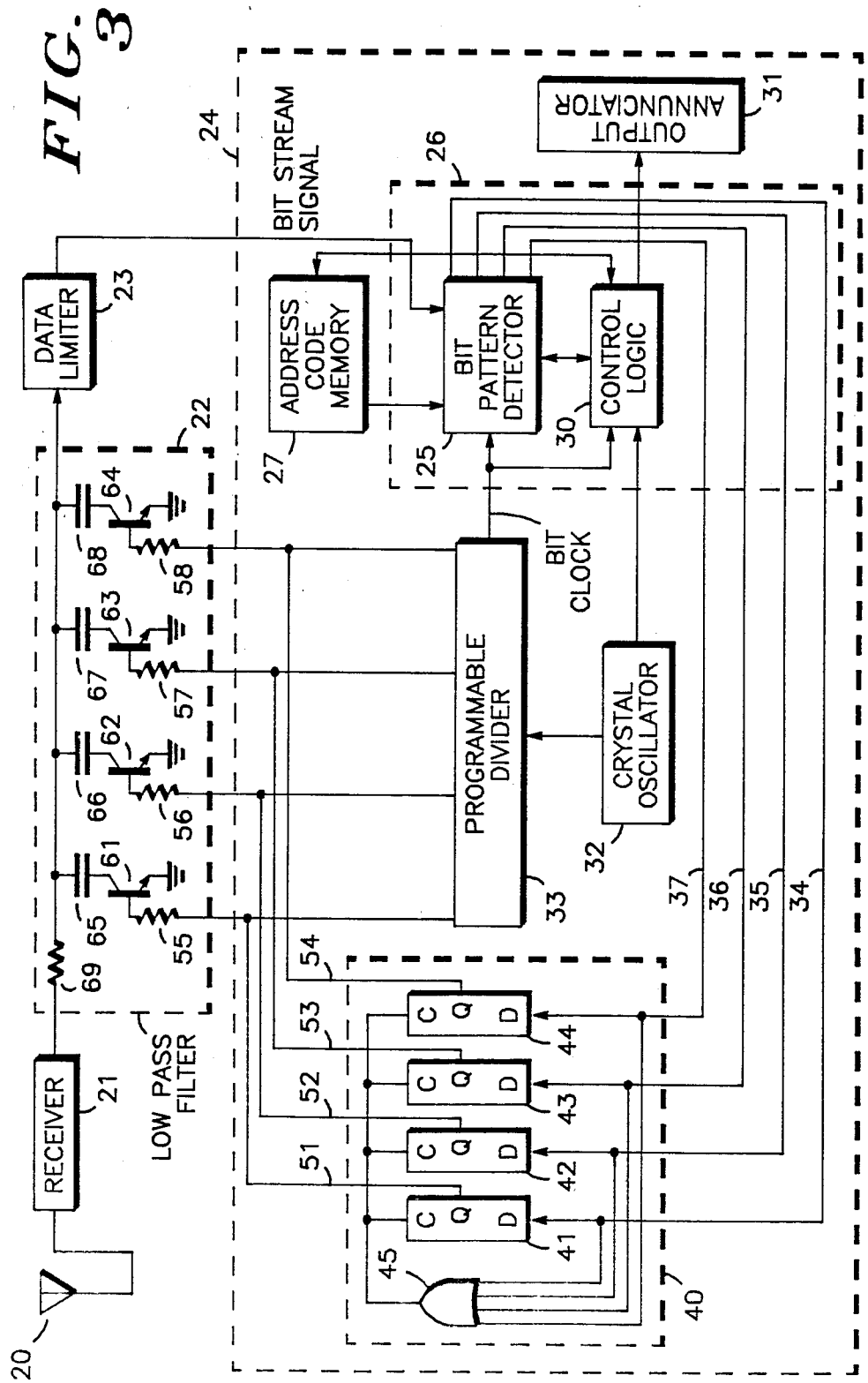
FIG. 3 is a combined block and schematic diagram of the receiver of FIG. 2 showing circuit details of certain blocks.

The crystal oscillator 32, which can be of conventional design, provides an output signal on line 70 of 38.4 kHz. Programmable divider 33 includes a prescaler 71, constituting a divide by 16, that receives the 38.4 kHz signal and has an output 72 providing an output signal at 2400 Hz. This output signal is then applied to programmable divide by N counter 73 and output lines 51–54 are operatively connected to divide by 8, divide by 4, divide by 2, and divide by 1 inputs, respectively. An output line 74 of counter 73 provides a signal which constitutes the bit clock. As will be appreciated bit clock signals of 300, 600, 1200, or 2400 Hz are selectively supplied at output 74 depending upon which of the lines 51–54 are actuated. As indicated in FIGS. 2 and 3, this output signal is supplied to both the bit pattern detector 25 and control logic 30 of the CPU 26. If multiple or "M" samples per bit are to be taken, then the bit clock signals must be increased by a factor of M. This can be accomplished by increasing the frequency of the crystal oscillator 32 by a factor of M. For four samples per bit, a crystal oscillator frequency of 154.6 kHz could be utilized providing bit clock signals of 1200, 2400, 4800 and 9600 at output 74 for bit rates of 300, 600, 1200 and 2400 bits per second respectively.

The values of capacitors 65–68 of FIG. 3 are selected to provide cut-off frequencies for the low pass filter 22 that are consistent with the bit rate that is being decoded. In particular, the cut-off frequency of the filter is selected to be one-half of the bit rate to provide optimum signal-to-noise performance in the decoder. The value of resistor 69 is 10 Kilo-ohms while a value of 0.1 microfarads for capacitor 65 is used for the 300 bit/second signalling rate. A value of 0.05 microfarads for capacitor 66 provides the 600 bit/second signalling rate, while a value of 0.025 microfarads for capacitor 67 effects 1200 bit/second signalling rate, and a value of 0.012 microfarads for capacitor 68 effects the 2400 bit per second signalling rate.

Figure 5B:
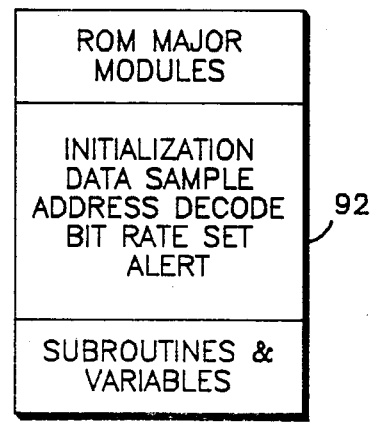
FIG. 5B is a functional diagram of another ROM showing major modules for use with the microcomputer of FIG. 5A.
Figure 5A:
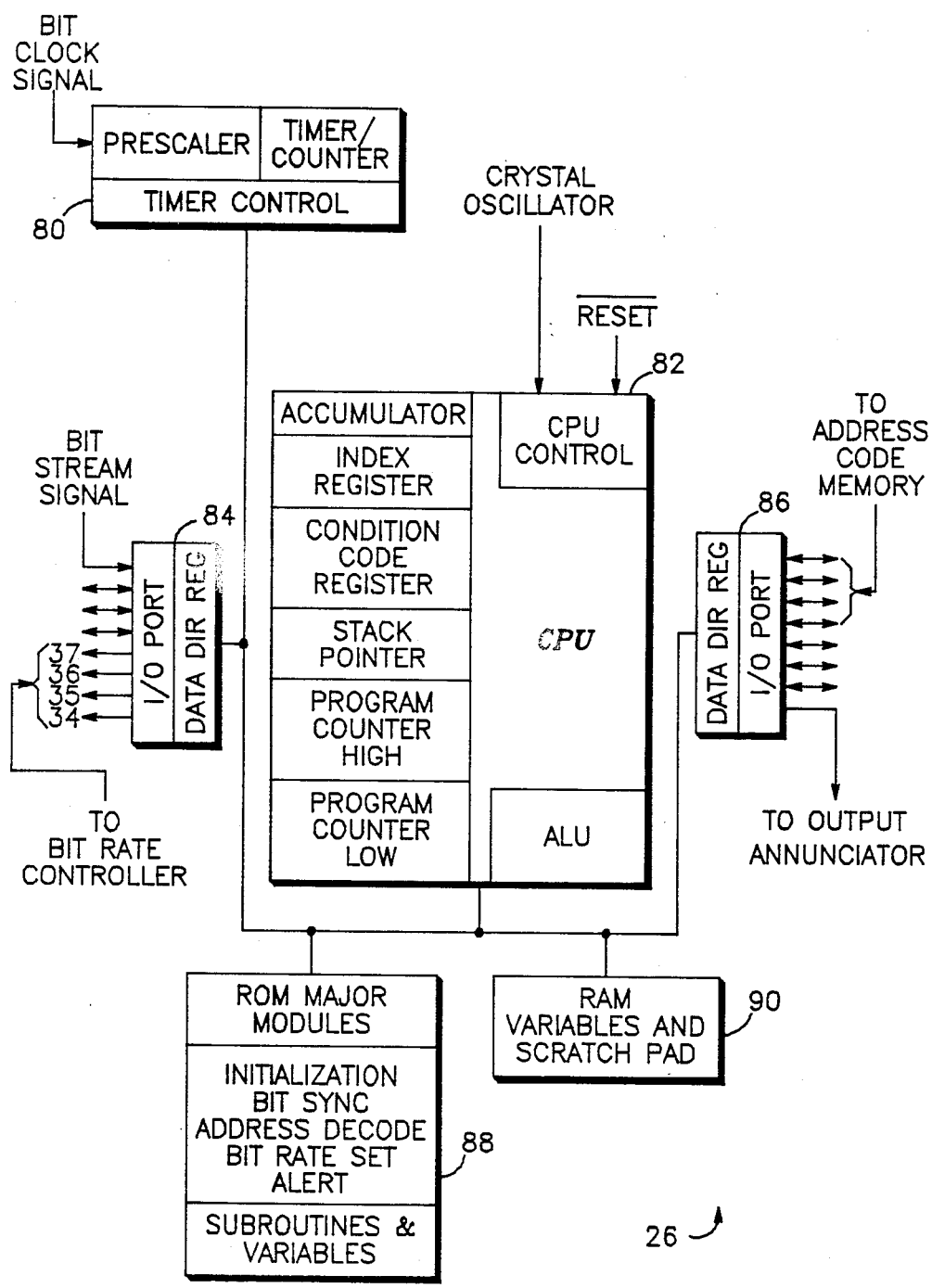
FIG. 5A is a functional diagram of a microcomputer utilized in the system incorporating the present invention.

FIG. 5A shows a functional block diagram of the microcomputer 26 which contains the firmware for implementation of the bit rate alteration function of the receiver. In the preferred embodiment of the invention as herein shown, the microcomputer is a Motorola 146805 type. U.S. Pat. No. 4,518,961 entitled "Universal Paging Device with Power Conservation", owned by the same assignee of this invention, discloses the use of such a microcomputer. The disclosure of this patent is hereby incorporated by reference.

The bit clock signal from programmable divider 33 is supplied to a timer control unit 80 containing a prescaler and a timer and counter. The output of crystal oscillator 32 is connected to a central processing unit (CPU) 82 which contains the central processing unit control circuit, an arithmetic logic unit designated ALU, an accumulator, index register, condition code register, stack pointer, program counter high and program counter low modules. Also connected to the central processing unit are data directional input/output (I/O) registers 84 and 86 having a plurality of input/output lines. In particular, eight lines are shown for each of two input/output ports.

As indicated, output lines of register 84 are connected to lines 34, 35, 36, and 37. An input line of register 84 is connected to receive the bit stream signal from data limiter 23. An output line of register 86 is connected to output annunciator 31. Four I/O lines of register 86 are connected to address code memory 27.

Also interfacing with the central processing unit are a read-only-memory (ROM) 88 and a random access memory (RAM) 90. As is characteristic of the Motorola 146805 family, the on-chip RAM permits the microcomputer 26 to operate without an external RAM memory. The parallel input/output capability includes programmable pins indicating whether it is to be an input or an output. The timer/counter 80 is normally an eight bit counter with a programmable prescaler which can be used as an event counter to generate interrupt signals at certain software-selected events or can be used for timing keeping.

FIG. 5A also shows the arrangement of major firmware modules stored in the ROM 88. The choice and arrangement of this module is a function of the specific program of the embodiments of the present invention. The use of RAM 90 is principally to contain variables accessed during the program and as a scratch-pad storage.

FIG. 5B illustrates an alternate arrangement of major firmware modules stored in a ROM 92 for other embodiments of the present invention.

The 146805 microprocessor and its associated architecture and internal instruction set have been described in detail in the following U.S. patents and applications: U.S. Ser. No. 054,093, filed July 2, 1979, entitled "Low Current Input Buffers"; U.S. Ser. No. 065,292, filed Aug. 9, 1979, entitled "Method for Reducing Power Consumed by a Static Microprocessor"; U.S. Ser. No. 065,293, filed Aug. 9, 1979, entitled "Apparatus for Reducing Power Consumed by a Static Microprocessor"; U.S. Pat. No. 4,300,195, filed Aug. 9, 1979, entitled "CMOS Microprocessor Architecture"; U.S. Pat. No. 4,280,190, filed Aug. 9, 1979, entitled "Incrementor/Decrementor Circuit"; and U.S. Pat. No. 4,308,581, filed Sept. 28, 1979, entitled "A Single Step System for a Microcomputer", all of the above six applications being commonly assigned to the assignee of the present invention. The six designated patents and applications are hereby incorporated by reference for a more complete description of the MC146805 microcomputer.

The operation of various embodiments of the receiver will now be discussed. A conventional POCSAG coding scheme is disclosed in FIGS. 7A and 7B. Referring first to FIG. 7A, in a POCSAG code format a sync code is transmitted followed by eight groups of address codes, namely groups 0-7, each of which includes two address segments. A single address segment is illustrated in FIG. 7B and consists of a 32 bit word. This 32 bit word includes a single bit message flag followed by address bits in bit positions 2 through 19. Function bits are provided in positions 20 and 21, parity check bits in position 22-31 and an even parity bit in position 32. In normal use, the POCSAG message flag bit is set to a 0 in address code signals and to a 1 in data signals. The function bits are normally used to provide four different messages for which four distinctive alert signals are generated.

Depending on the desired operation of receivers 14 or 15, several variations can be made to the POCSAG code of FIG. 7 to provide for variable bit rate operation. Referring first to FIGS. 8A-C, a coding scheme is illustrated in which a six bit code word is transmitted immediately after the sync code. An example of how the six bit code word might be encoded to indicate which one of four bit rates should be used, is illustrated in FIG. 8C.

Here, the six bit sequence simply represents a repetition of the four basic binary values 00, 01, 10 and 11 with the repetition provided for one bit of error correction as is well known in the art. The binary word 000000 corresponds to 300 bits per second, while binary word 010101 corresponds to 600 bits per second, and binary word 101010 corresponds to 1200 bits per second. A bit rate code of 111111 corresponds to 2400 bits per second.

Figure 13A:
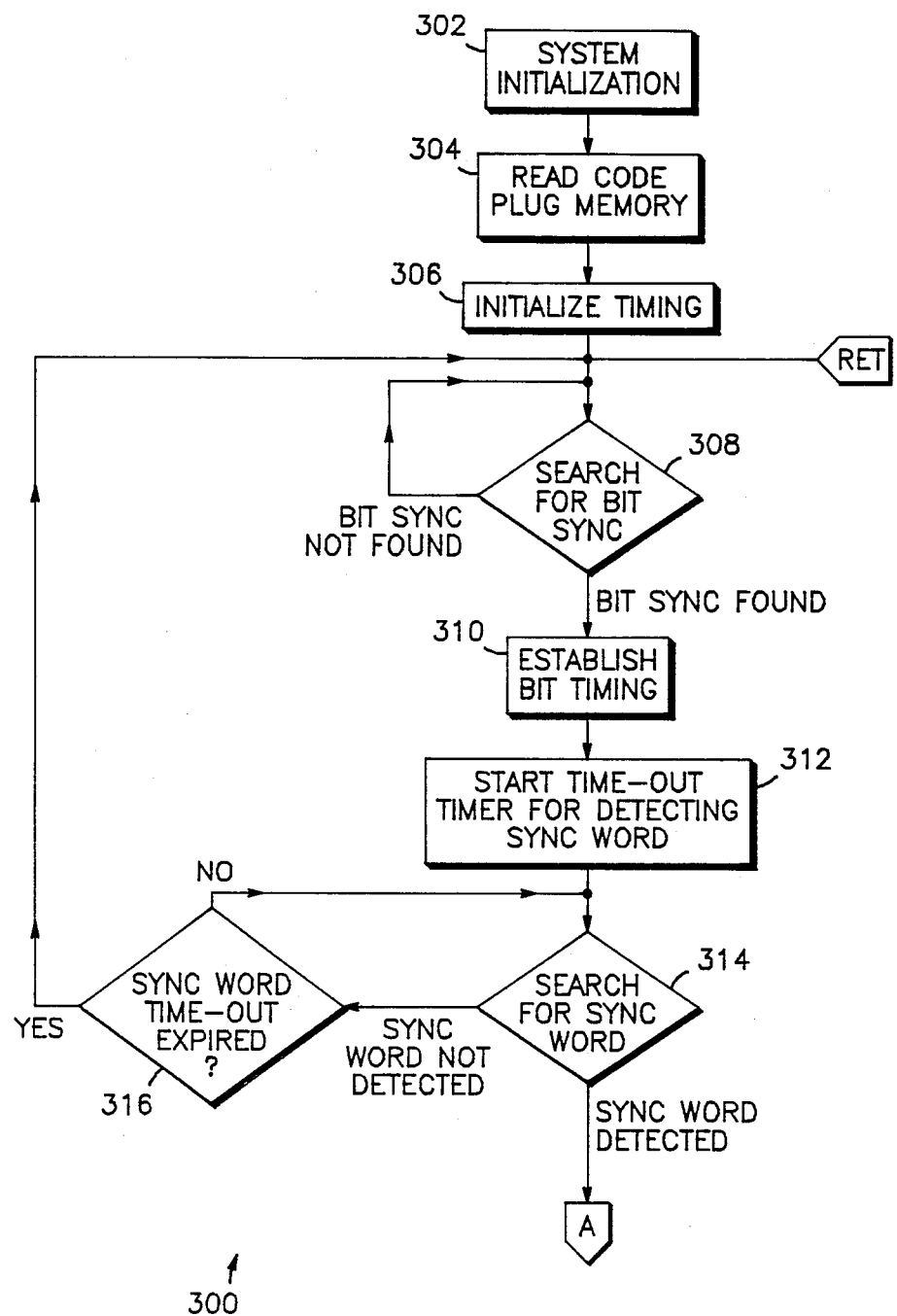
FIGS. 13A, 13B, 13C and 13D comprise a detailed flowchart of the implementation of the preferred embodiment of the invention utilizing the data encoding system of FIGS. 8A–8C.

In a system utilizing the code illustrated in FIGS. 8A-C, receiver 14 or 15 would detect a sync code at a predetermined bit rate. It would then detect the bit rate code at the same predetermined bit rate. Based upon which of the bit rate codes is detected, it would change its bit rate to correspond to the transmitted bit rate code and then look for address during its appropriate group window. The control logic for operation of the receiver under this system is illustrated in FIGS. 13A-C.

As illustrated in flow chart 300 of FIGS. 13A-D, the system is first initialized, block 302. Next the code plug memory is read, at 304, the result of which is utilized to initialize the timing, such as shown at 306. A search for bit sync is initiated at 308. If bit sync is not found the search routine is re-initiated. If bit sync is found bit timing is established, 310, which in turn is effective to start a time-out timer for detecting sync word, indicated at 312, which is used to effect a search for a particular sync word, represented by block 314. If the sync word is not detected the search will continue for a predetermined time, see block 316, after which the routine reverts back to a search for bit sync, block 308.

Figure 13B:
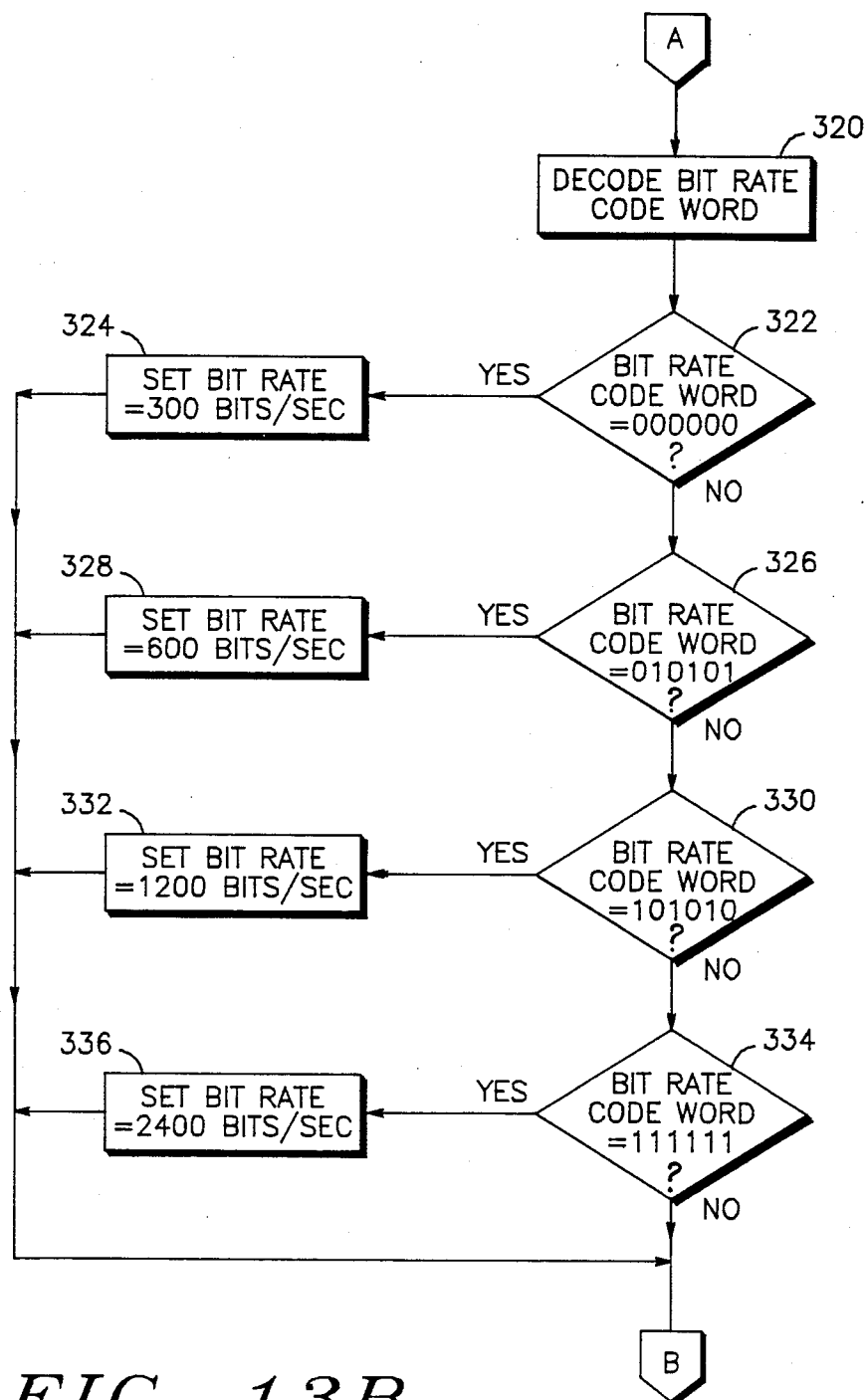

Referring now to FIG. 13B, if the sync word is detected, the decoding of the bit rate code word is initiated at 320. Four bit rate variations are possible in this instance with bit rate code words of 000000, 010101, 101010, and 111111 detected at blocks 322, 326, 330 and 334 respectively. Depending on which bit rate variation is detected, the appropriate bit rate of 300, 600, 1200, or 2400 bits/sec is set at blocks 324, 328, 332 or 336 respectively.

Figure 13C:
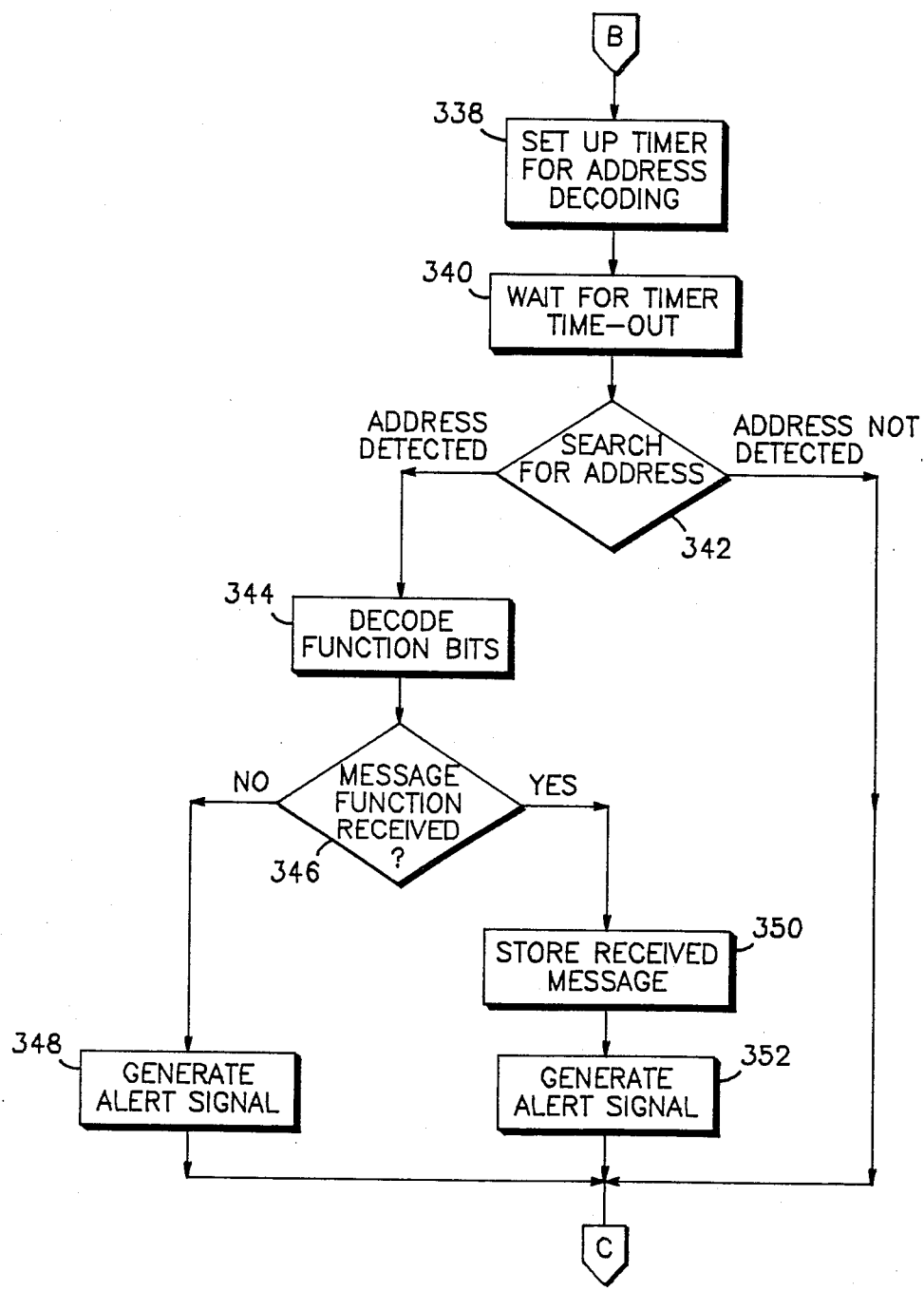
Figure 13D:
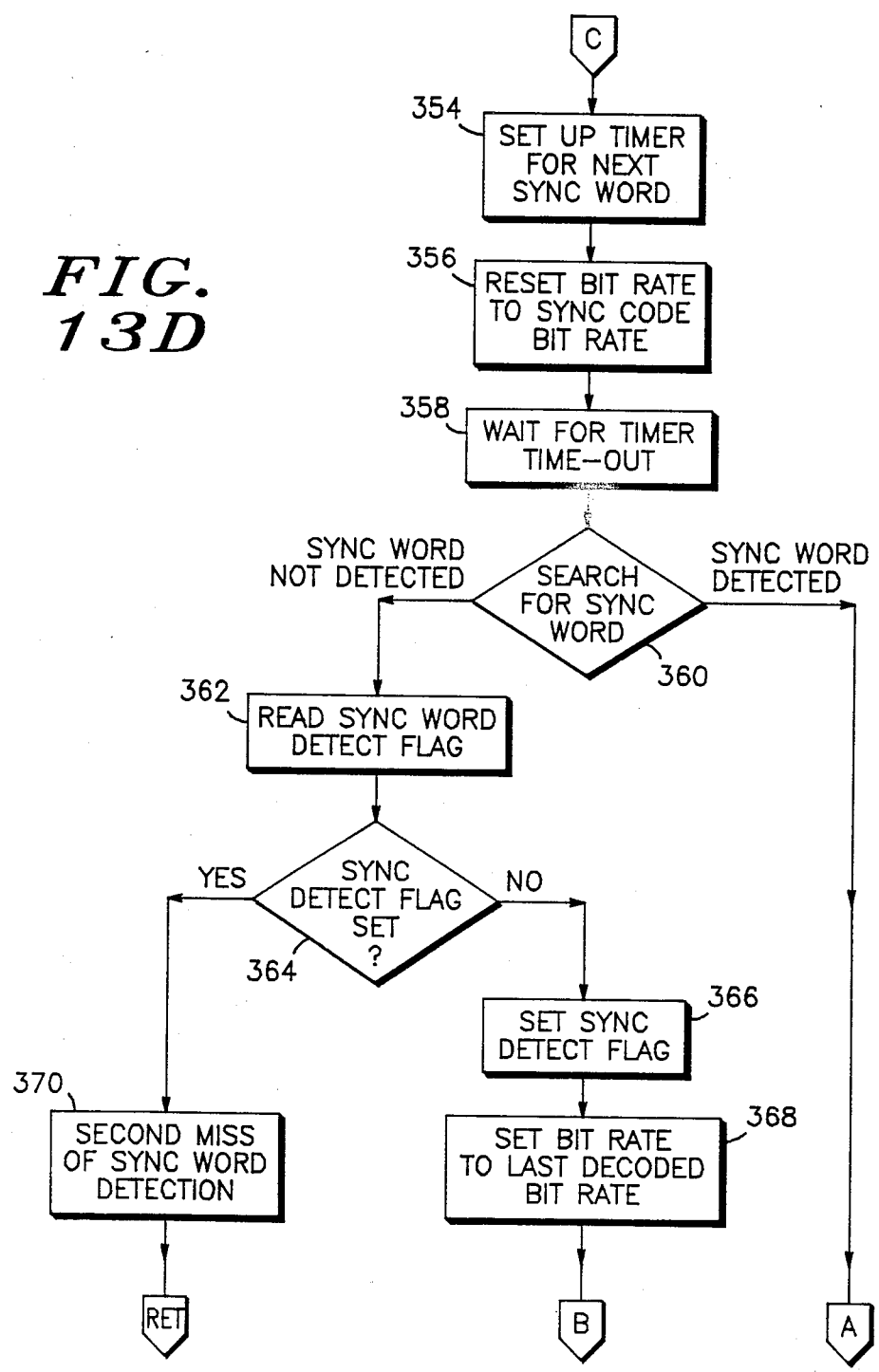

This set bit rate is then utilized to set up the timer for address decoding, as represented by block 338 in FIG. 13C. A wait is made for time-out, block 340, after which a search is initiated for address, as indicated by block 342.

If the address is detected, function bits are decoded, block 344. The decoded function bits are examined to determine if a message function was received, as shown at block 346. If it is not a message function, then an alert signal is generated, block 348. However, if a message function is indicated, the message is stored, block 350, then an alert signal is generated, 352. After generation of an alert signal, at 348 or 352, or if an address is not detected, at 342, a timer is set up for next sync word, as illustrated by block 354, in FIG. 13D. The bit rate is then reset to sync code bit rate, block 356. The routine then waits for timer time-out, block 358, and a new search for sync word is initiated, block 360. If the sync word is detected, the routine returns to decode the bit rate code word at block 320.

If the sync word is not detected, a sync word detect flag is read, block 362, and then examined to determine whether or not the sync detect flag is set, block 346. If the flag is not already set, the sync detect flag is then set, as illustrated in block 366. The routine then sets the bit rate to last decoded bit rate, block 368, and returns to set up the timer for address decoding, block 338. If the sync detect flag was already set, the routine branches to second miss of sync word detection, block 370, and then returns to search for bit sync at 308.

Recapping briefly, in the routine illustrated by flow chart 300, a sync code is always transmitted at a predetermined bit rate, such as 300 bits per second. Once bit sync has been established, block 308, the sync word must be detected, block 314. Following the sync code, the bit rate code is transmitted at the predetermined 300 bits per second. The bit rate code is decoded at block 320 and the system is then set, blocks 324, 328, 332, and 336, for the indicated bit rate. This setting includes actuating the bit rate controller 40 to control both the low pass filter 22 and programmable divider 33 so that an appropriate bit clock signal can be provided to bit pattern detector 25. The timer is set for address decoding at block 338, the timer setting depends both upon the group to which the radio is assigned as well as, the bit rate at which addresses and data are being transmitted. The receiver searches for its address at block 342 and takes appropriate action depending on whether or not its address is detected. The receiver bit rate is then reset, block 356, to the sync code bit rate to look for the next sync code. If the next sync code is detected, the bit rate code word is decoded in the usual manner, block 320. However, in the event that the sync word is not detected, the receiver will still search for its address at the appropriate group. Since the current bit rate code has not been decoded, the system will utilize the last decoded bit rate, block 368, when searching for its address. In the event that a sync code is not detected for a second consecutive time, block 370, the system returns to the search for bit sync, block 308. This system is particularly well suited for increasing system through-put during peak system loading times by providing for increased bit rate transmission of both the radio addresses as well as any data messages.

A different bit rate signalling control scheme is illustrated in FIGS. 9A-C which has some similarity to the signalling scheme of FIGS. 8A-C. Both of these are similar to the POCSAG system of FIGS. 7A-C, in that a sync code is followed by eight windows or pairs of address codes. In FIG. 9B, a particular address command is illustrated that includes a message flag bit, a change bit rate command signal in bit positions 2-19, bit rate control bits in bits 20-21, 10 check bits in bits 22 to 31 and an even parity bit in 32. As shown in FIG. 9C, control bits 20 and 21 could be coded for instance with a 00 to indicate 300 bits per second, 01 for 600 bits per second, 10 for 1200 bits per second, and 11 for 2400 bits per second.

In the system of FIGS. 9A-C, the change bit rate command signals can be transmitted to each of the eight groups of pagers, thereby causing the radios to be set to the new bit rate as designated in FIG. 9C. After transmitting the change bit rate command in each paging window, the system then returns to sending radio addresses in a normal manner, but at the new indicated bit rate.

Figure 14A:
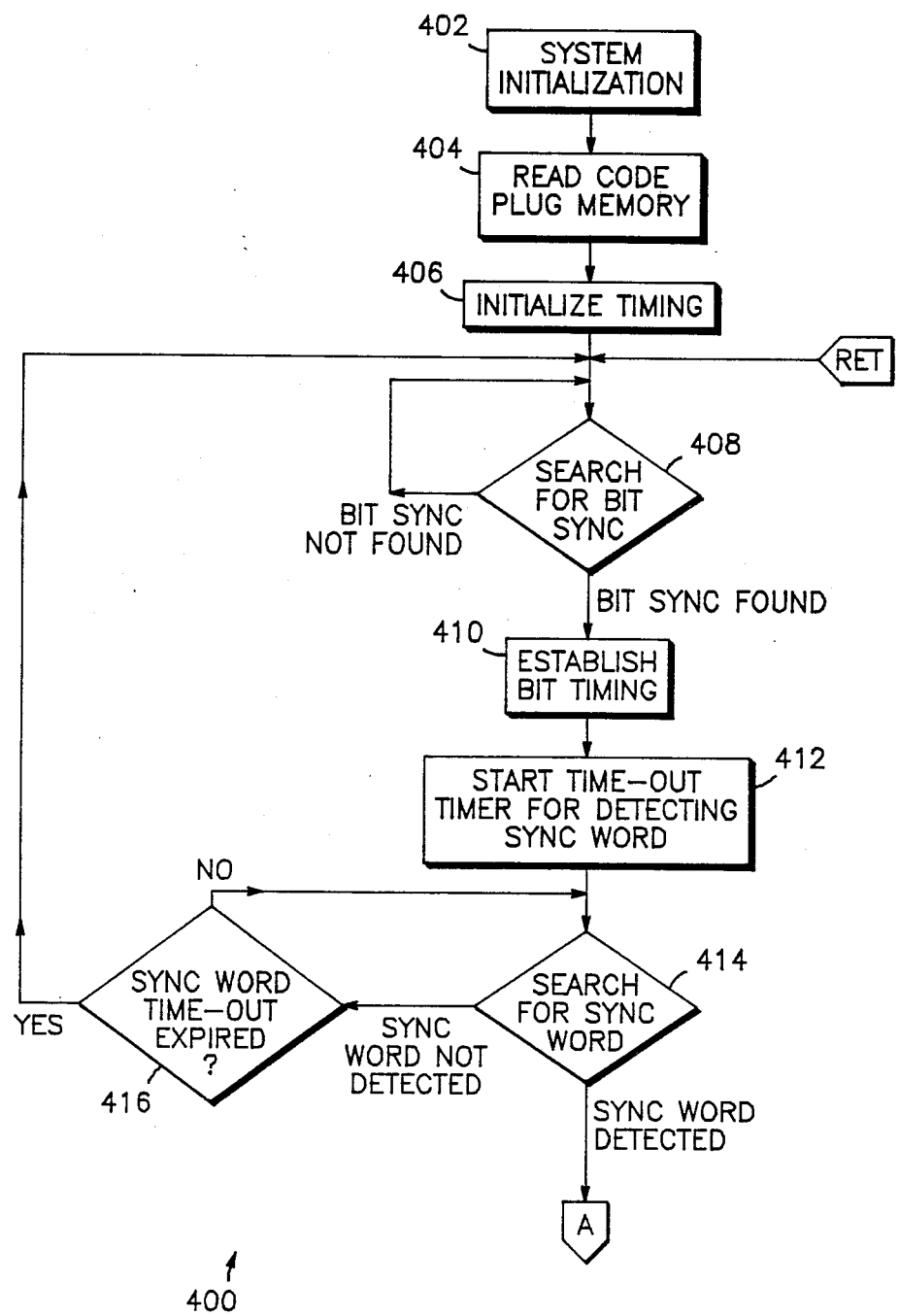
FIGS. 14A, 14B and 14C comprise a detailed flowchart of the implementation of the preferred embodiment of the invention utilizing the data encoding system of FIGS. 9A–9C.
Figure 14B:
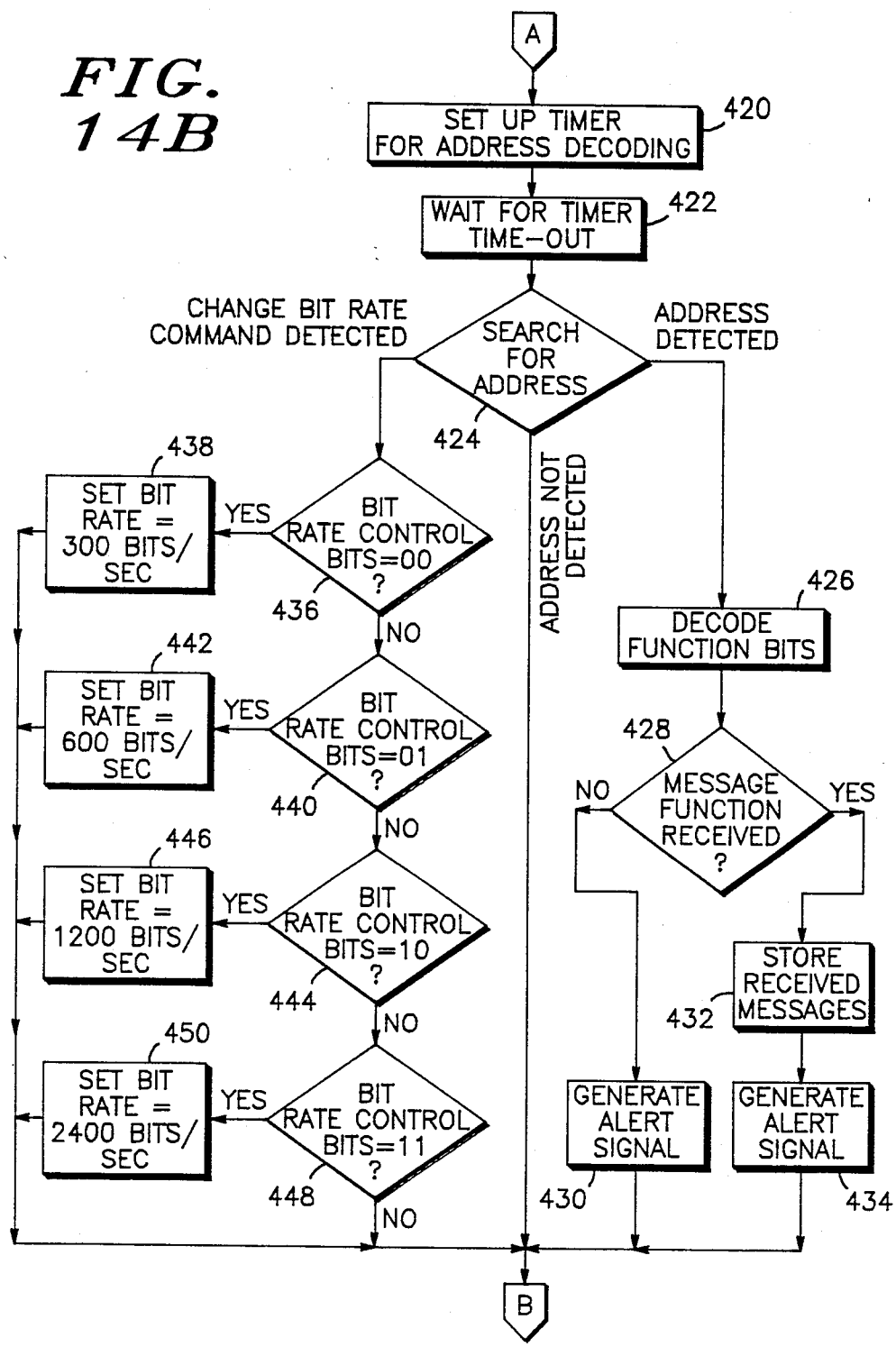
Figure 14C:
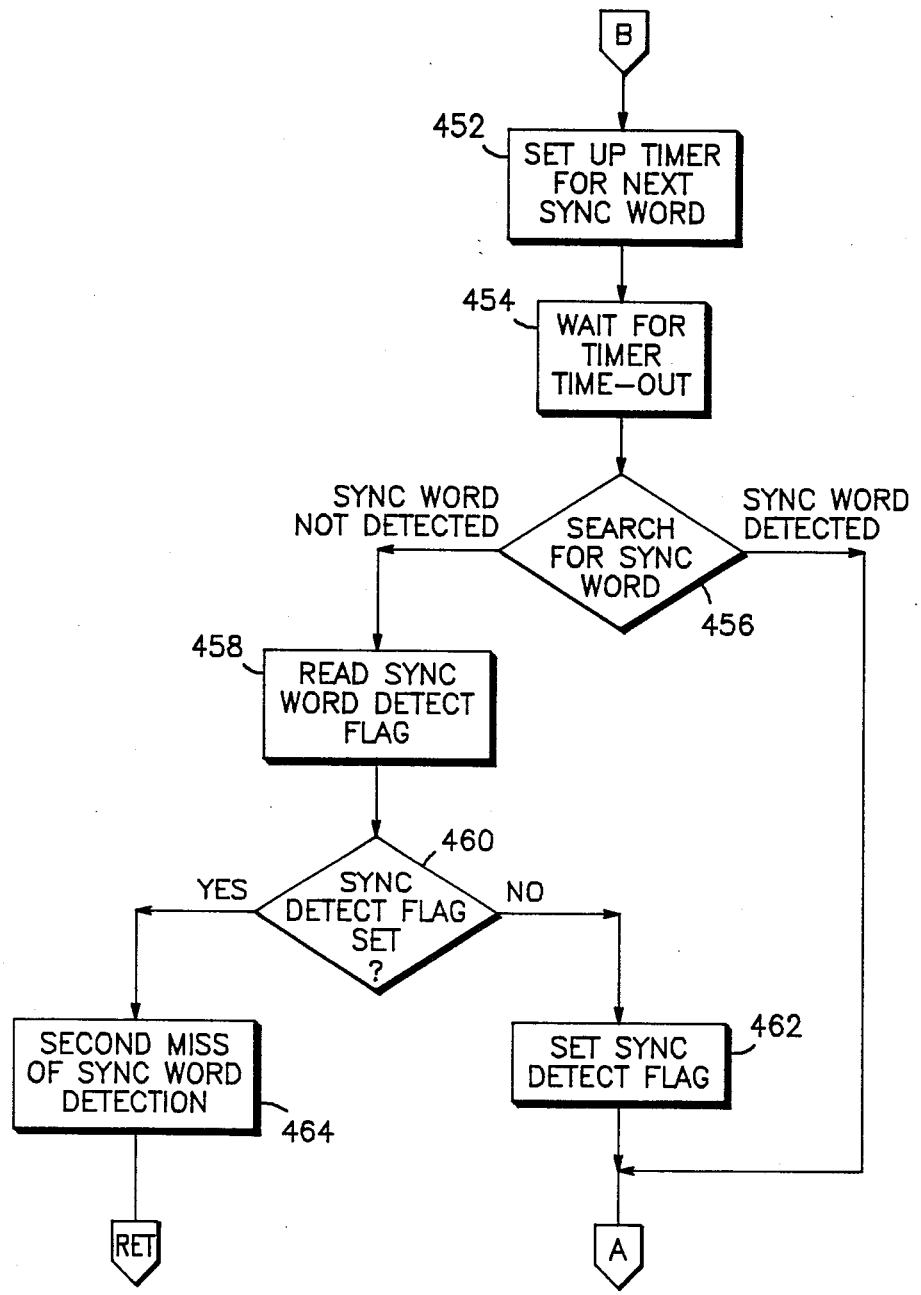

As illustrated in flow chart 400 of FIGS. 14A-C, the system is first initialized, block 402. Next the code plug memory is read, at 404, the result of which is utilized to initialize the timing, such as shown at 406. A search for bit sync is initiated at 408. If bit sync is not found, the search routine is re-initiated. If bit sync is found, bit timing is established, 410, which in turn is effective to start a time-out timer for detecting sync word, indicated at 412, which is used to effect a search for a particular sync word, represented by block 414. If the sync word is not detected, the search will continue for a predetermined time, see block 416, after which the routine reverts back to a search for bit sync, block 408.

If the sync word is detected, a timer is set up for address decoding, as represented by block 420 in FIG. 14B. A wait is made for time-out, block 422, after which a search is initiated for address, as indicated by block 424. If the address is detected, function bits are decoded, at block 426, the function bits are then examined to determine if a message function was received, as shown at block 428. If it is not a message function, then an alert signal is generated, block 430. However, if a message function is indicated the message is stored, block 432, then an alert signal is generated, block 434. If a change bit rate command is detected at 424, the bit rate control bits are examined, at blocks 436, 440, 444, and 448 to determine which one of the four possible variations, with bit rate control bits of 00, 01, 10, and 11, is detected. Depending on which bit rate variation is detected, the appropriate bit rate is set to 300, 600, 1200 or 2400 bits/sec at blocks 438, 422, 446 and 450 respectively.

After generation of an alert signal, block 430 or 434, or setting of the bit rate, blocks 438, 442, 446, or 450, or if an address or a change bit rate command is not detected at block 424, the timer is set up for the next sync word, as is illustrated at block 452 of FIG. 14C. The routine then waits for timer time-out, block 435, and a new search for sync word is initiated, block 456. If the sync word is not detected, a sync word detect flag is read, block 458, to determine whether or not the sync detect flag is set, block 460. If the flag is not already set, the sync detect flag is then set, as illustrated at 462. After setting the sync detect flag or if the sync word is detected at block 456, the routine returns to set the address decoding timer, block 420. If the sync detect flag was already set, the routine branches to second miss of sync word detection, block 464, and then returns to search for bit sync, block 408.

To briefly recap, the routine illustrated by flow chart 400, like that of flow chart 300, decodes the sync code at a predetermined bit rate, such as, 300 bits per second. However, unlike flow chart 300, in this system addresses are also transmitted and decoded at the predetermined bit rate. In addition to a normal receiver address that can be detected at block 422, a change bit rate command can also be detected. The change bit rate command can be recognized by one or preferably all of the receivers in each group. If the change bit rate command is detected the following 2 bits are examined at blocks 436, 440, 444, and 448 to determine the new system bit rate. This new system bit rate then becomes the predetermined bit rate for the receiver and further decoding of sync codes and addresses are done at the new bit rate. This new bit rate is retained until such time as another change bit rate command is detected to provide for selection of a new system bit rate. The system bit rate is effected by sending the change bit rate command signals to each group of radios so that all the radios in the system will operate at the new bit rate. This system can provide for even greater through-put than the system of flow chart 300, since even the sync words are sent at the new bit rate.

Figures 10A, 10B, 10C:
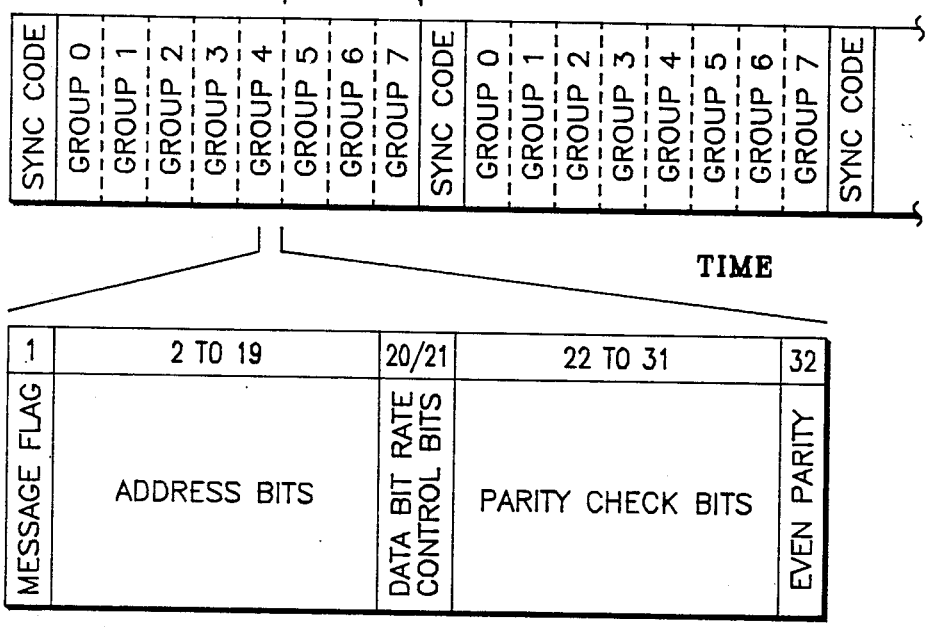
FIGS. 10A, 10B and 10C comprise a descriptive diagram for a third data encoding system for the preferred embodiment of the invention.

In the system of FIGS. 10A-C, the control bit patterns are transmitted with each page address to indicate the bit rate of data following the address signal. After the data message is decoded, the pager reverts to the sync code bit rate. Thus, this system provides the ability to adjust the bit rate of individual message transmissions.

Figure 15A:
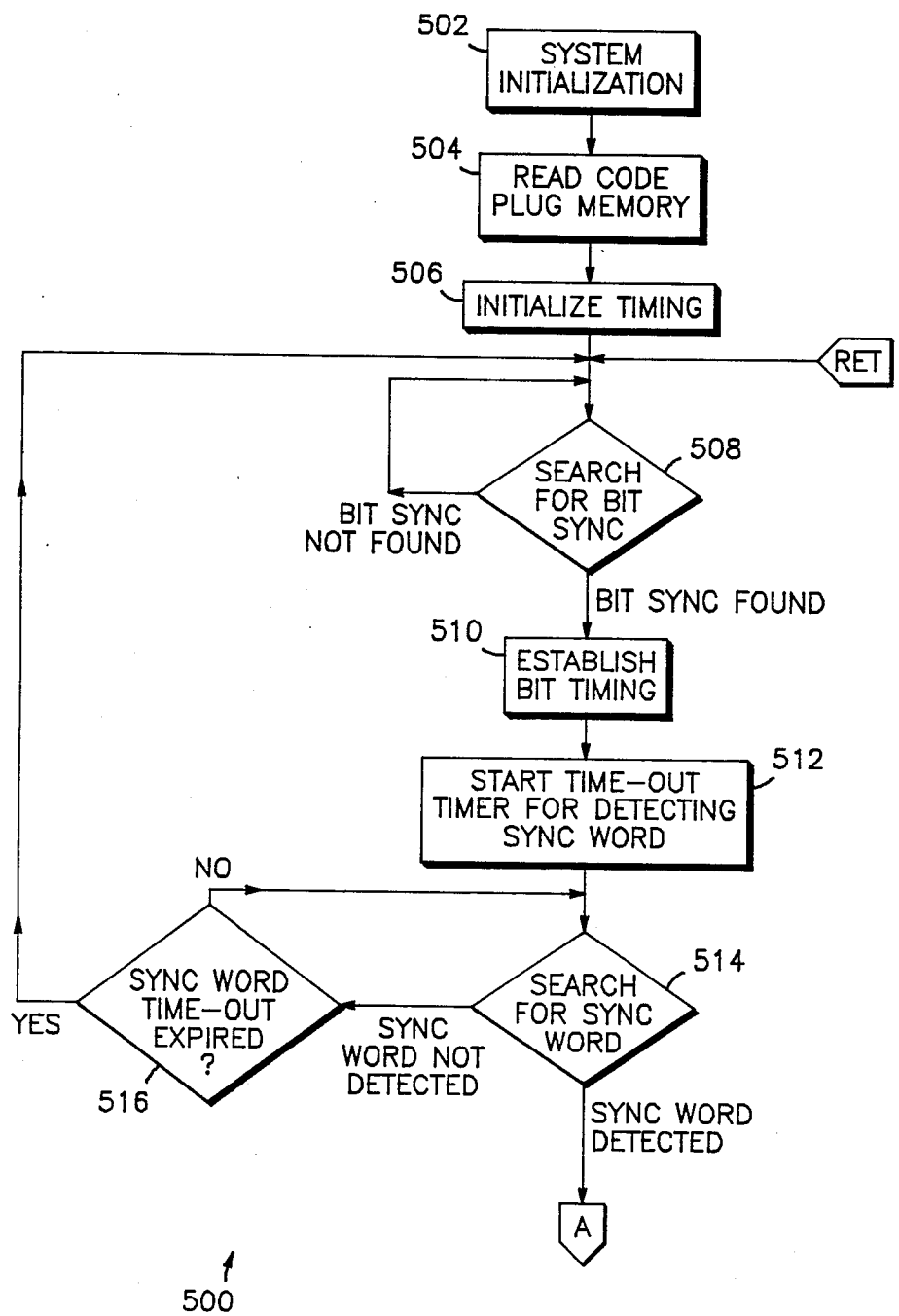
FIGS. 15A, 15B and 15C comprise a detailed flowchart of the implementation of the preferred embodiment of the invention utilizing the data encoding system of FIGS. 10A–10C.
Figure 15B:
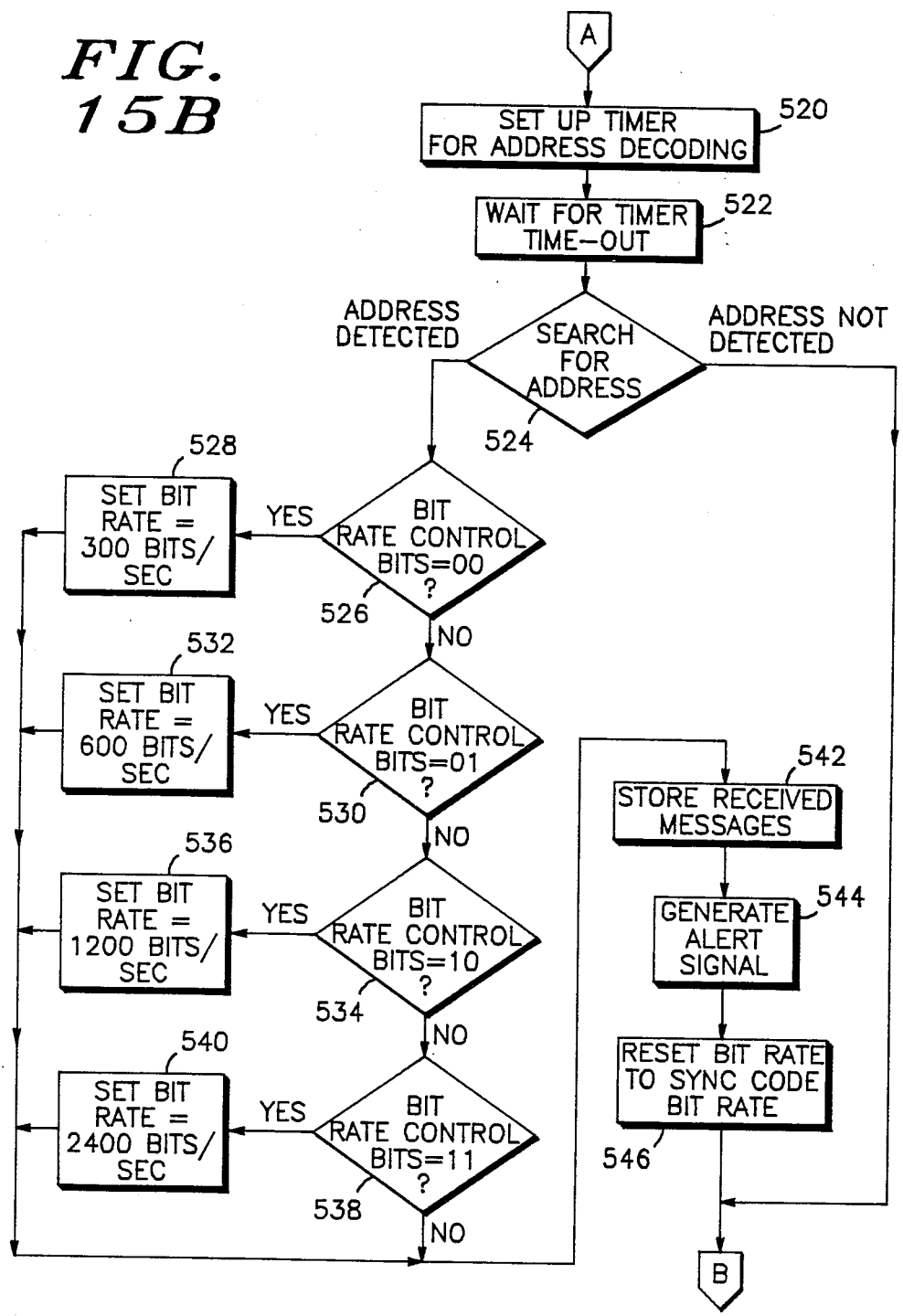
Figure 15C:
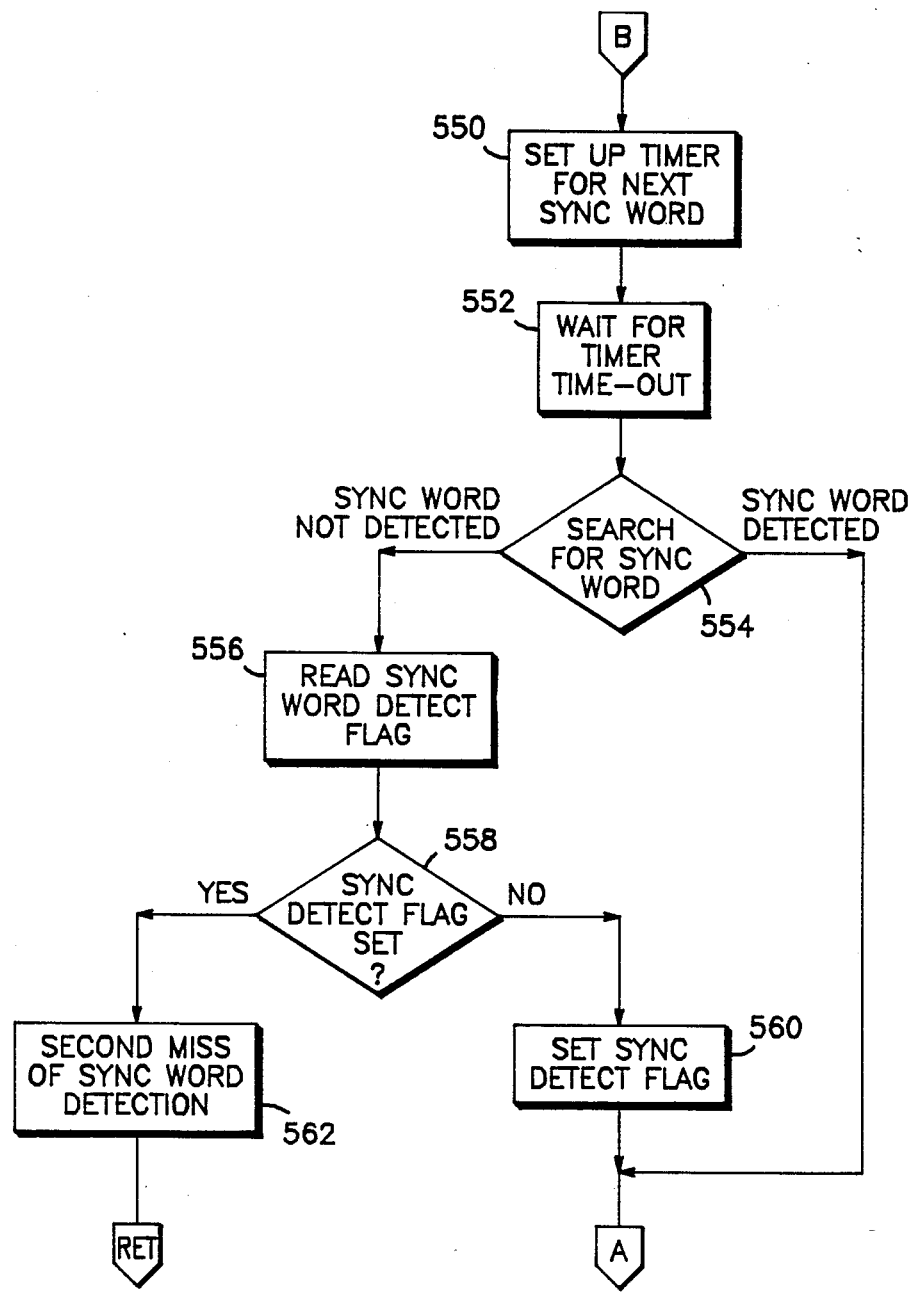

As illustrated in flow chart 500 of FIGS. 15A-C, the system is first initialized, block 502. Next the code plug memory is read, at 504, the result of which is utilized to initialize the timing, as shown at 506. A search for bit sync is initiated at 508. If bit sync is not found, the search routine is re-initiated. If bit sync is found, bit timing is established, 510, which in turn is effective to start a time-out timer for detecting sync word, indicated at 512, which is used to effect a search for a particular sync word, represented by block 514. If the sync word is not detected, the search will continue for a predetermined time, see block 516, after which the routine reverts back to a search for bit sync, block 508.

If the sync word is detected, a timer is set up for address decoding as represented by block 520 in FIG. 15B. A wait is made for time-out, block 522, after which a search is initiated for address as indicated by block 524. If the address is detected, the bit bit rate control bits are examined, blocks 526, 530, 534, and 538 to determine which one of the four possible variations is detected. Depending on which bit rate variation is detected, the appropriate bit rate is set to 300, 600, 1200, or 2400 bits/sec, as represented by blocks 528, 532, 536 and 540 respectively. The received message is stored, block 542 and an alert signal is then generated, block 544. The bit rate is then reset to the sync code bit rate, as indicated at 546.

After resetting the bit rate, or if the address is not detected at block 529, the timer is set for the next sync word, block 550 illustrated in FIG. 15C. The routine then waits for timer time-out, block 552, and a new search for sync word is initiated, block 554. If the sync word is not detected, a sync word detect flag is read, block 556, to determine whether or not the sync detect flag is set, block 558. If the flag is not already set, the sync detect flag is then set, as illustrated at 560. After setting the sync detect flag or if the sync word is detected at block 554, the routine returns to set the address decoding timer, block 520. If the sync detect flag was already set, the routine branches to a second miss of sync word detection, block 562, and returns to search for bit sync, block 508.

Recapping briefly, the routine of flow chart 500 illustrates a system in which the sync code and the address are transmitted at a predetermined bit rate. If the message is not a simple tone only page but includes a numeric or alphanumeric data message, this data message is sent at a bit rate indicated by the bit rate control bits that follow the address. The bit rate control bits are decoded at the predetermined bit rate. The data message is decoded at the bit rate designated by the bit rate control bits. The bit rate of the receiver is then reset to the predetermined bit rate to decode the next sync word. This system can be used when some increase in system through-put is needed, as when long data messages are being transmitted. Since only data messages are transmitted at the new bit rate, any errors resulting from an increase in the bit rate will only affect the data messages of the receivers and not tend to increase the rate of false address detections by receivers. This is due to the fact that the receiver address is still transmitted at the predetermined bit rate.

Referring now to FIGS. 11A-C, a coding scheme is illustrated that is similar to the GOLAY sequential code (GSC) or the so called ECHO code used in some Motorola paging systems. As illustrated in FIG. 11A, an address signal is followed by bit rate information and then data. The address signal format is illustrated in FIG. 11B and includes two words, a first word 1 and a second word 2. Each word consists of 12 bits of information followed by 11 parity bits with a half bit space separating the two words. In this embodiment, the bit rate code encodes four bit rates with the six bit repetition code previously discussed. Thus, 000000 corresponds to 300 bits per second, 010101 corresponds to 600 bits per second, 101010 corresponds to 1200 bits per second, and 111111 corresponds to 2400 bits per second.

Figure 16A:
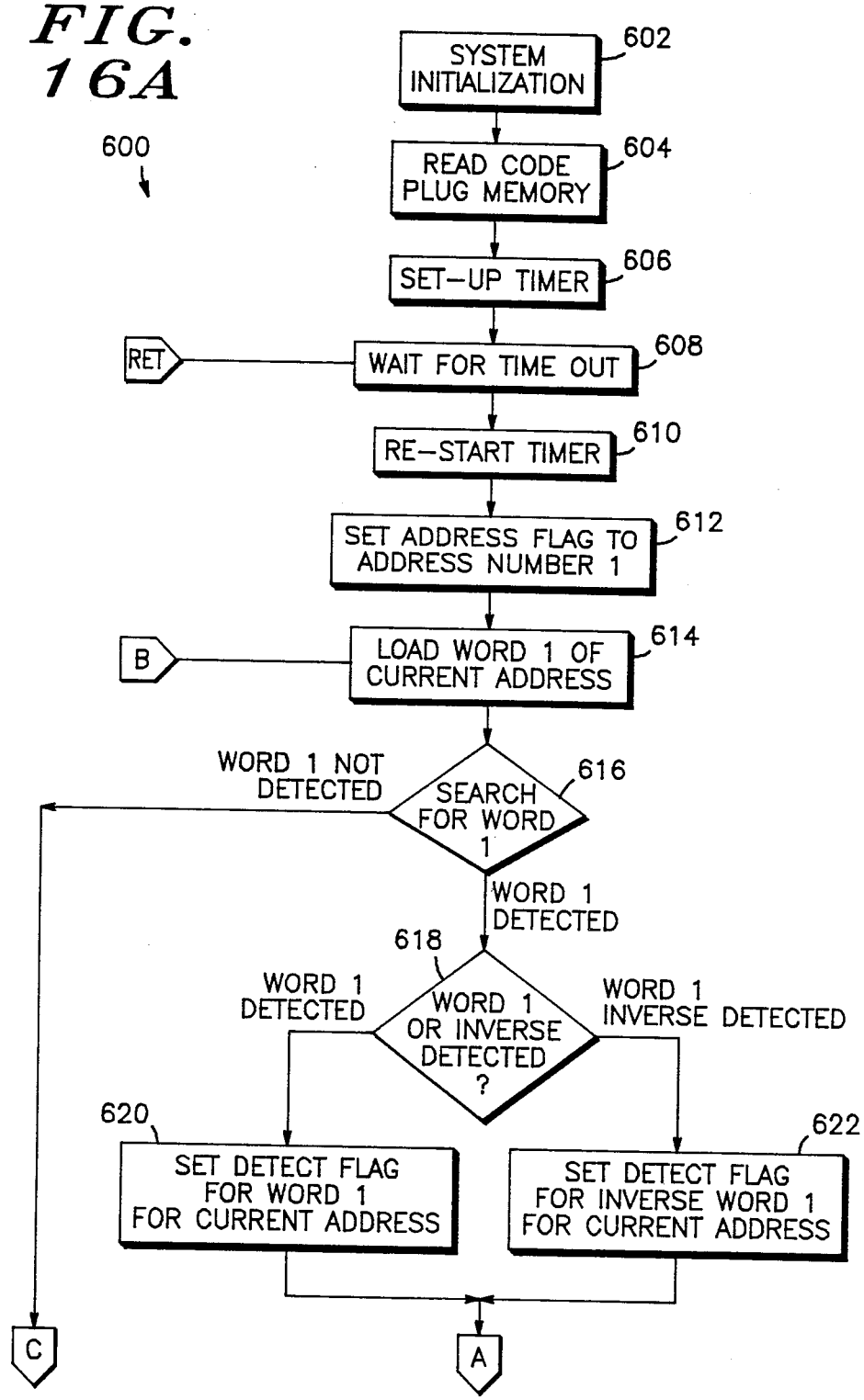
FIGS. 16A, 16B and 16C comprise a detailed flowchart of the implementation of the preferred embodiment of the invention utilizing the data encoding system of FIGS. 11A–11C.
Figure 16B:
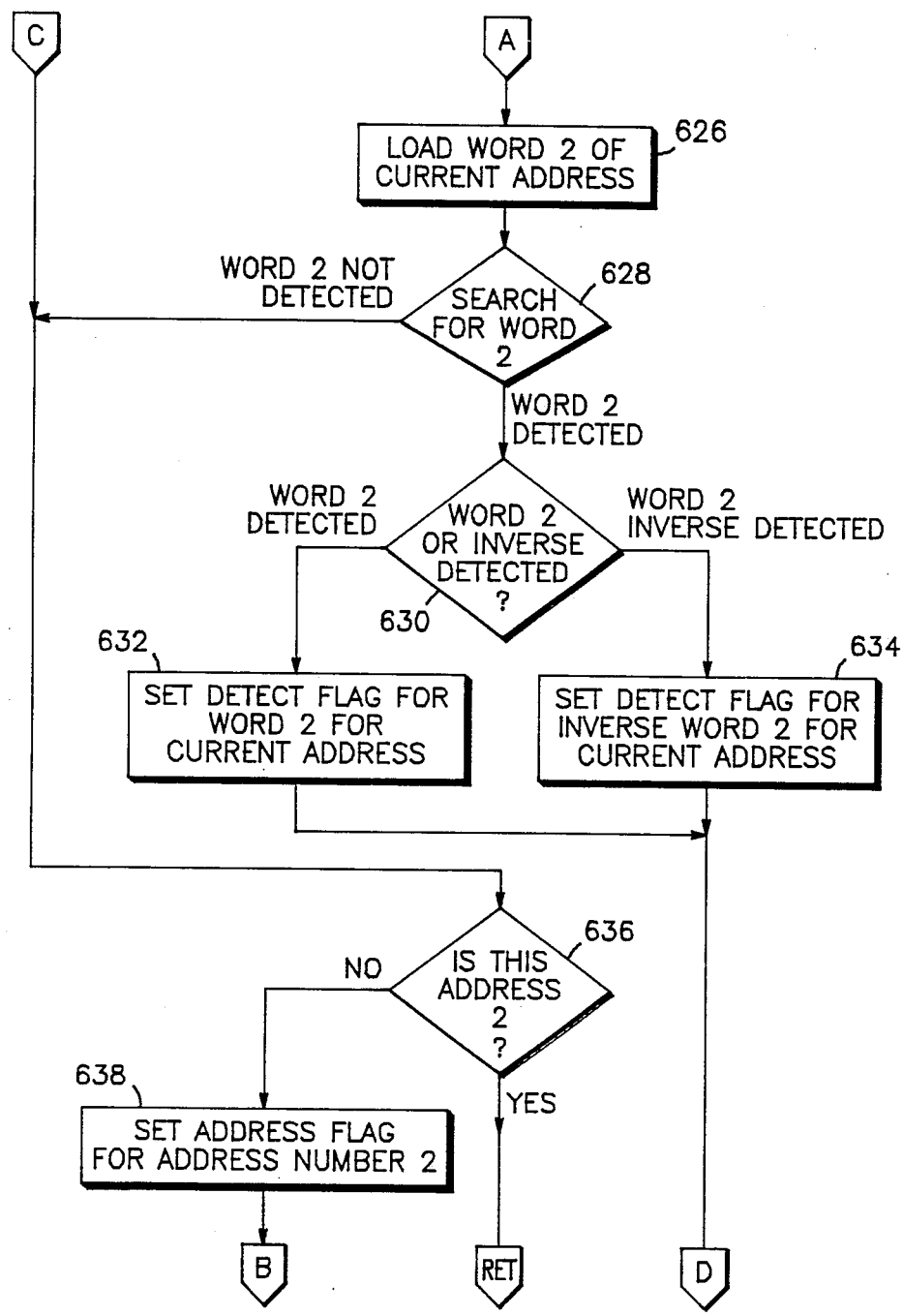
Figure 16C:
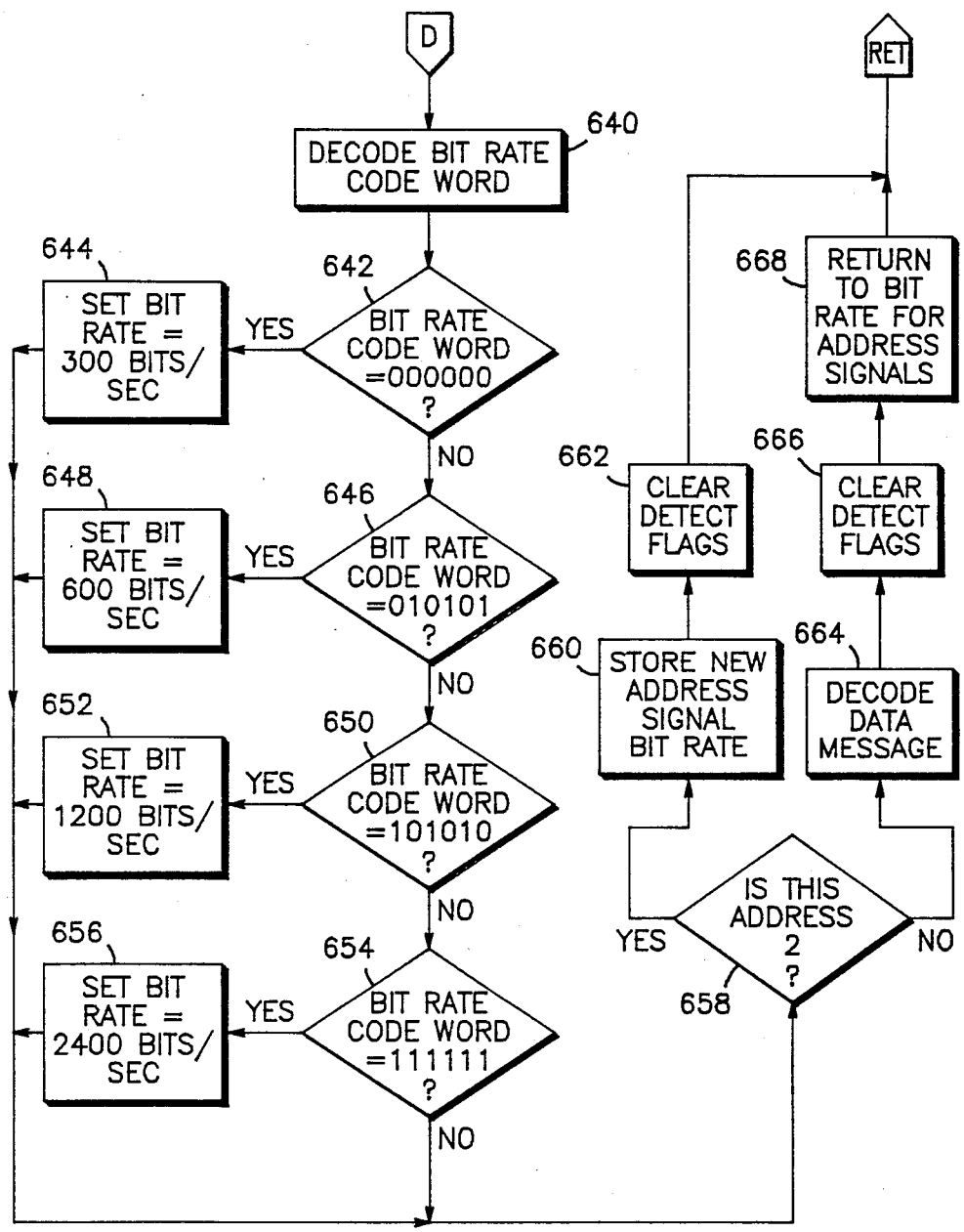

While data is indicated as following the bit rate code in FIG. 11A, it will be understood that data need not be included, particularly where the default or system address bit rate of the receiver used for decoding the address signal is being changed. As illustrated in FIGS. 16A-C, the selective call receiver can respond to two distinct address signals. With the first of the address signals, the bit rate designated by the bit rate code is used for decoding the data message and the receiver reverts to the system bit rate to again look for its address. When the second pager address signal is transmitted, the bit rate code is retained as the new system address signal bit rate.

The control logic for operation of the receiver under this system is illustrated in flow chart 600 of FIGS. 16A-C. The system is first initialized at 602 in FIG. 16A. Next the code plug memory is read, block 604, and timing is set-up, block 606. After a wait for time out at 608, timing is re-started at 610. An address flag is then set for address number 1, block 612, and word 1 of the current address, address 1 at this time, is loaded, block 614. A search for word 1 is then initiated at 616. If word 1 is not detected, the routine branches to determine if the address flag is currently set to word 2, block 636 of FIG. 16B. However, if word 1 is detected, it is examined, block 618, to determine whether or not its inverse was detected. If it is word 1, a detect flag for word 1 for current address is set, block 620, and if it is word 1 inverse, a detect flag for inverse word 1 for current address is set block 622.

After setting the appropriate word 1 detect flag, word 2 of the current address is loaded, as shown at 626 of FIG. 16B. A search for word 2 of the present address is then initiated at 628. If word 2 is not detected the routine again branches to determine if the current address flag is set to address 2, block 636. If it is not address 2, the address flag is set for address number 2 at 638 and the routine returns to load word 1 of the current address, in this case address 2, at block 614. In the event that the address flag is already set to address 2, the routine returns to wait for time out at block 608.

In the event that word 2 is detected at 628, it is examined at 630 to determine whether or not its inverse is detected. If its inverse is detected, a detect flag for inverse word 2 for current address is set, block 634 and if word 2 is detected, the detect flag for word 2 for current address is set, block 632.

After setting the appropriate detect flag, the routine decodes the bit rate code word, at block 640 of FIG. 16C. The decoded bit rate code word is examined at blocks 642, 646, 650 and 654 to determine which at the four possible variations represented by 000000, 010101, 101010 and 11111 is decoded. The appropriate bit rate of 300, 600, 1200 or 1400 is then set at block 644, 648, 652, or 656 respectively. After setting the bit rate, the address flag is examined to determine whether or not address number 2 was detected, block 658.

If it is address 2, the bit rate is stored as the new address signal bit rate, block 660. Detect flags are then cleared at 662 and the routine returns to wait for time out, block 608 of FIG. 16A If the address flag is not set to address 2, the data message is decoded, block 664, at the designated bit rate. Detect flags are then cleared at 666, the bit rate is returned to the system bit rate for address signals at 668, and the routine returns to wait for time out, block 608.

Recapping briefly, the system illustrated in flow chart 600, while a Golay type system, is similar to the system illustrated in flow chart 500 for a POCSAG system. After decoding the receiver's address at the predetermined bit rate, a bit rate code word is decoded at the predetermined bit rate at 640. The bit rate of the receiver is set as determined by the bit rate code word. If the receiver has decoded its address 2, this new bit rate is then stored as the new receiver system bit rate. In this manner the entire system bit rate is reset. If, however, it is determined that the decoded receiver address is address 1, this designates that a data message follows and the data message is decoded and the receiver then returns to the predetermined system bit rate to decode the next address signal. This scheme, therefore, can be utilized for resetting the system bit rate and/or for controlling the bit rate for data messages.

Figures 12A, 12B, 12C:
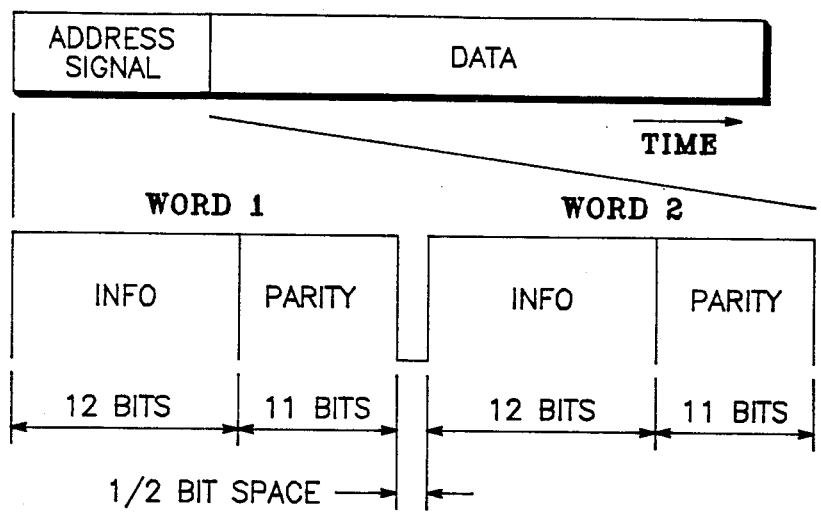
FIGS. 12A, 12B and 12C comprise a descriptive diagram for a fifth data encoding system for the preferred embodiments of the invention.

Referring now to FIGS. 12A–C, another coding scheme is illustrated that is similar to a GOLAY sequential code (GSC) or ECHO code. As illustrated in FIG. 12A, an address signal is followed by a any data message. The address signal format is illustrated in FIG. 12B and includes two words, a first word 1 and a second word 2. Like FIG. 11A, each word consists of 12 bits of information followed by 11 parity bits with a half bit space separating the two word. However, in this embodiment, the bit rate of data is indicated by the function code of the address signal. The function code is determined by whether word 1 and word 2 are sent or if their binary inverses are sent. As illustrated in FIG. 12C, function 1, indicated by sending word 1 and word 2, corresponds to a bit rate of 300 bps. Function 2, indicated by sending word 1 and the binary inverse of word 2, corresponds to 600 bps. Function 3, indicated by sending the inverse of word 1 and word 2, corresponds to 1200 bps. While function 4, indicated by sending the inverse of word 1 and the inverse of word 2, corresponds to 2400 bps.

Figure 17B:
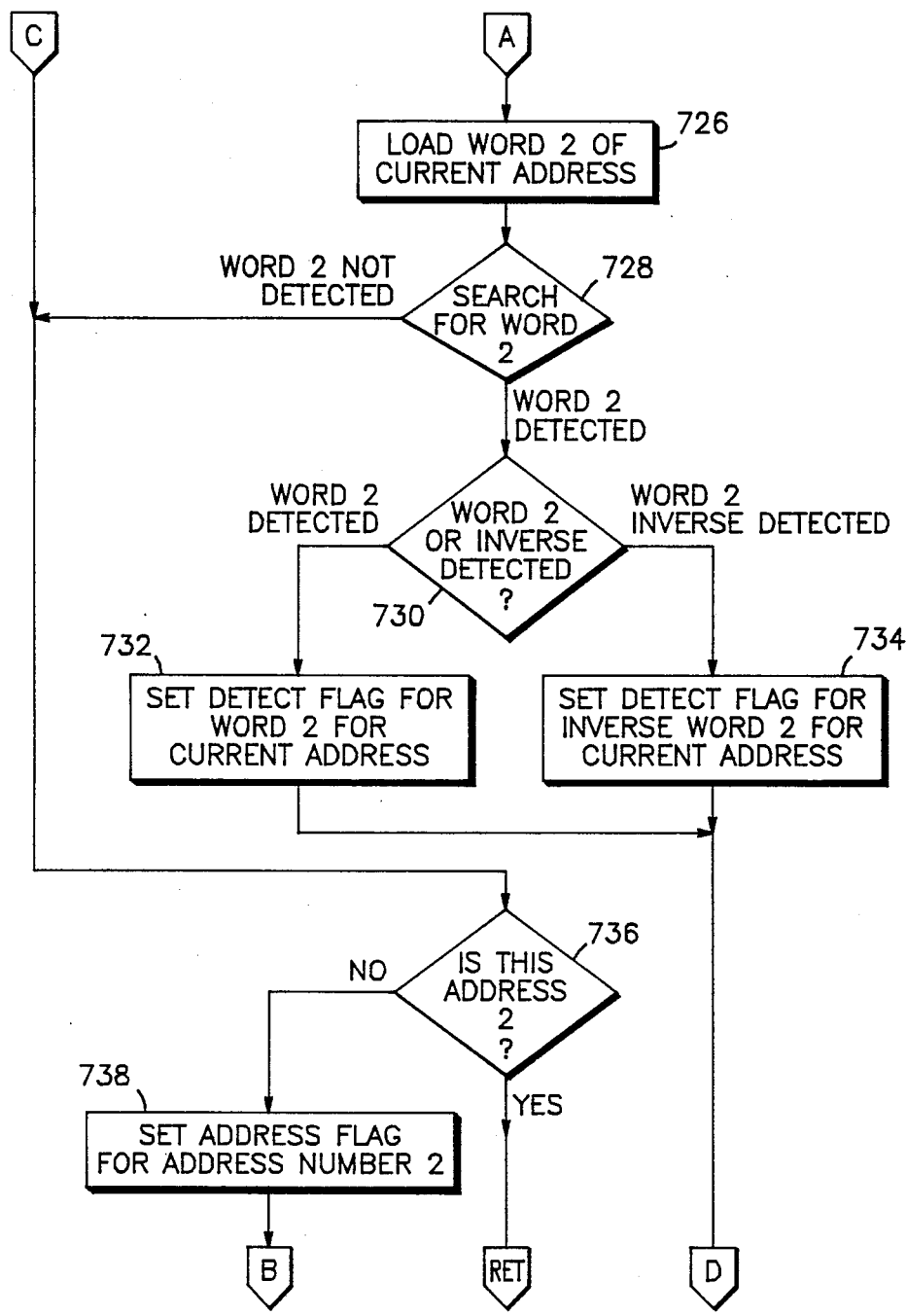
Figure 17C:
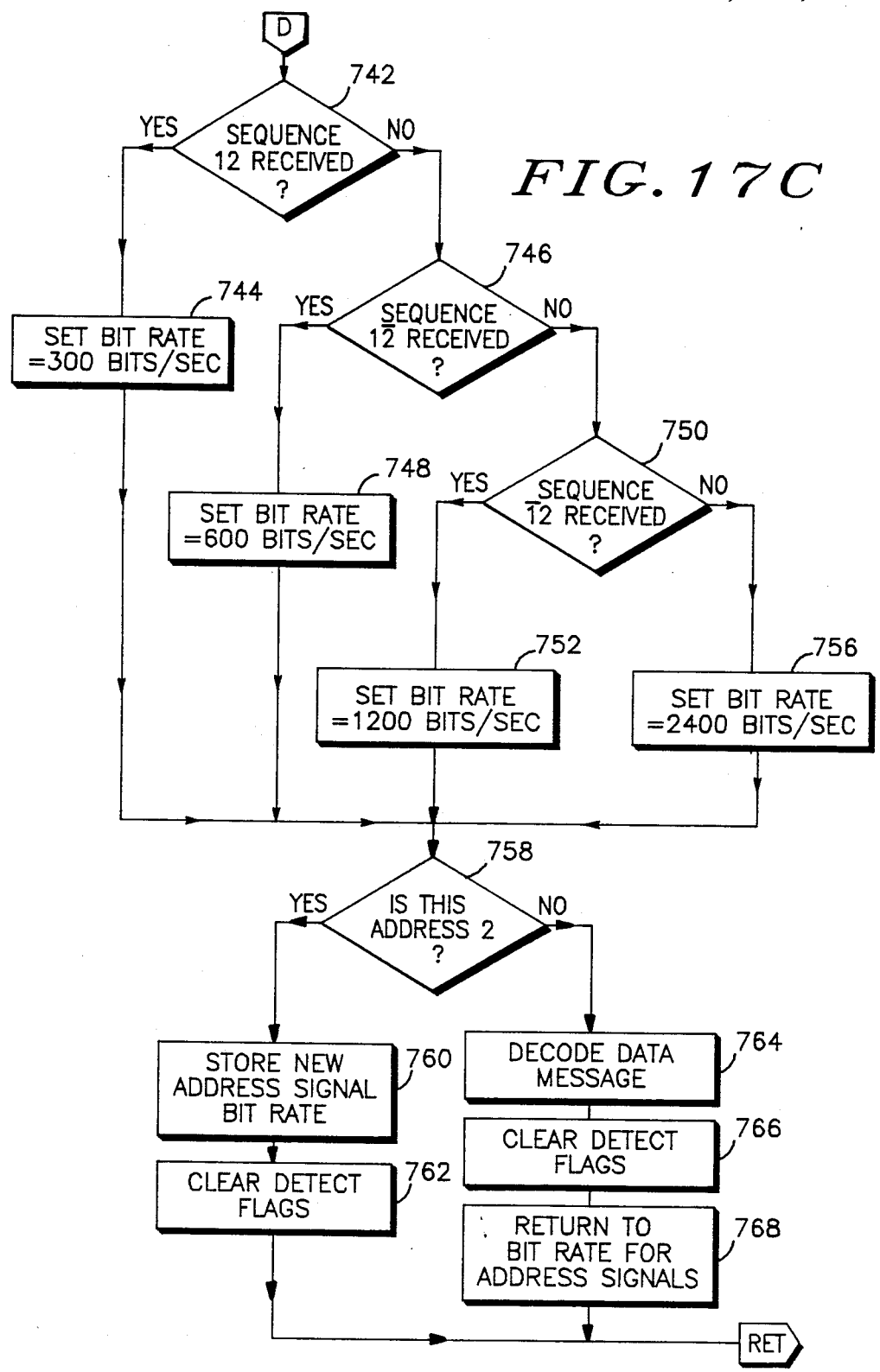

While data is indicated as following the bit address signal in FIG. 12A, it will be understood that data need not be included, particularly where the default bit rate of the receiver used for decoding the address signal is being changed. As is illustrated in FIGS. 17A–C, the receiver can respond to two distinct address signals. With the first of the address signals, the function code is used for setting the bit rate for decoding the data message and the receiver then reverts to the default bit rate for the next address. When the second receiver address signal is transmitted, the bit rate designated by the transmitted function is retained as the new default system address signal bit rate.

The control logic for operation of the receiver under this system is illustrated in flow chart 700 of FIGS. 17A–C. The system is first initialized at 702 of FIG. 17A. Next the code plug memory is read, block 704, and timing is set-up, block 706. After a wait for time out 708, timing is re-started at 710. An address flag is set to address number 1, block 712, and word 1 of current address is loaded, block 714. A search for word 1 is then initiated at 716. If word 1 is not detected, the routine branches to determine if the address flag is set to word 2, at block 736 of FIG. 17B.

If word 1 is detected, it is examined at block 718 to determine whether or not its inverse was detected. If it is word 1, a detect flag for word 1 for current address is set, block 720, while if word 1 inverse is detected a detect flag for inverse word 1 for current address is set, block 722.

After setting the appropriate word 1 detect flag, word 2 of current address is loaded, as illustrated at block 726 of FIG. 17B. A search for word 2 of the present address is then initiated, block 728. If word 2 is not detected the routine again branches to determine if the address flag is currently set at address 2, block 736. If it is not address 2, the address flag is set for address number 2 at 738 and the routine returns to load word 1 of the current address, in this case word 2, at block 714. In the event that the address flag is already set to address 2, the routine returns to wait for time out at block 708.

When word 2 is detected at 728, it is examined at 730 to determine whether or not its inverse is detected. If its inverse is detected, a detect flag for inverse word 2 for current address is set at 734. If instead word 2 is detected, rather than its inverse, the detect flag for word 2 for current address is set at 732.

After setting the appropriate detect flag, the routine proceeds to examine the received function code in order to set the bit rate. At block 742 of FIG. 17C, if sequence 12 is received the routine branches to set the bit rate to 300 bits/sec at block 744. If it is not, the function code is examined at block 746 and if the sequence 12 bar is received the routine branches to set the bit rate to 600 bits/sec at block 748. If neither of these sequences were detected, the function code is examined at block 750 and if the sequence 1 bar 2 is received, the routine branches to set the bit rate to 1200 bits/sec at block 752. If none of these function code sequences were received, the sequence must be 1 bar 2 bar, the bit rate is accordingly set to 2400 bit/sec at block 756.

After setting the bit rate as designated by the function code, the address flag is examined to determine whether or not address number 2 was detected, block 758. If it is address 2, the bit rate is stored as the new address signal bit, block 760. Detect flags are then cleared at 762 and the routine returns to wait for time out, block 708 of FIG. 17A. If the address flag is not set to address 2, the data message is decoded, block 764, at the designated bit rate. Detect flags are then cleared at 766, the bit rate is returned to the system bit rate for address signals, block 768, and the routine returns to wait for time out, block 708.

Recapping briefly, the system of flow chart 700 like the system of flow chart 600, resets the predetermined bit rate if address 2 is received while if address 1 is received, the data message is decoded at the new bit rate and the receiver returns to a predetermined bit rate for decoding the next address signal. Unlike the system of flow chart 600 which utilizes a special bit rate word transmitted with the address, the system for flow chart 700 utilizes the function code of the transmitted address to designate the bit rate. This system is useful either for providing increased through-put and allowing for increased bit rate transmission of data messages or for providing for increased reliability of data messages by providing for decreased bit rate transmission of data messages. The system also permits resetting of the system bit rate including address signals for providing more substantial control of system through-put.

While various disclosed embodiments have been illustrated utilizing four bit rates, it will be understood that any desired bit rate can be utilized in the system simply by choosing appropriate divisors for the programmable divider. The system can be provided with a single alternative bit rate or any desired number of bit rates that can be selected by the bit rate code word, function bits or other transmitted information. For even greater flexibility, a programmable divider having a large number of divisor possibilities can be utilized and the actual divisor to be used by the divider can be transmitted as the bit rate code.

By transmitting code signals to control individual receiver decoder bit rates, maximum flexibility can be obtained in a selective call radio system for controlling through-put and overall accuracy.

I claim as my invention:

1. A selective call radio receiver for receiving digitally encoded radio signals transmitted to a plurality of radio receivers at a predetermined bit rate, comprising:
   means for receiving said digitally encoded radio signals,
   bit rate timing means for generating a bit rate signal at said predetermined rate,
   decoder means responsive to the bit rate signal for decoding the digitally encoded signal,
   control means responsive to the decoded digitally encoded signal for selectively actuating the bit rate timing means for generating a bit rate signal at different rate corresponding to a now predetermined bit rate and maintaining the new predetermined bit rate until a signal is received designating a new bit rate.

2. A method of operating a selective call radio receiver in a plural population of receivers, comprising the steps of:
   receiving first digital information signals transmitted at a predetermined bit rate,
   decoding at the predetermined bit rate the received information, including information designating a new predetermined bit rate for further information,
   receiving further information signals transmitted at said new predetermined bit rate,
   and decoding at said new predetermined bit rate the further received information and maintaining the new predetermined bit rate until information designating a new bit rate is received.

3. The method of claim 2 wherein:
   the further information signals includes address information for the receiver, and
   data information.

4. The method of claim 2, wherein the further information signals include a sync code.

5. The method of claim 4, wherein:
   the further information includes address information for the receiver.

* * * * *